(12) United States Patent
Yang et al.

(10) Patent No.: US 10,812,241 B2
(45) Date of Patent: Oct. 20, 2020

(54) TECHNIQUES AND APPARATUSES FOR HARQ-ACK TIMELINE INDICATION AND HARQ-ACK MULTIPLEXING AND BUNDLING IN NEW RADIO

(71) Applicant: QUALCOMM Incorporated, San Diego, CA (US)

(72) Inventors: Yang Yang, San Diego, CA (US); Wanshi Chen, San Diego, CA (US); Juan Montojo, San Diego, CA (US); Bilal Sadiq, Basking Ridge, NJ (US); Renqiu Wang, San Diego, CA (US); Heechoon Lee, San Diego, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 70 days.

(21) Appl. No.: 16/125,222

(22) Filed: Sep. 7, 2018

(65) Prior Publication Data
US 2019/0081762 A1    Mar. 14, 2019

Related U.S. Application Data

(60) Provisional application No. 62/556,800, filed on Sep. 11, 2017.

(51) Int. Cl.
*H04W 4/00* (2018.01)
*H04L 5/00* (2006.01)
(Continued)

(52) U.S. Cl.
CPC .......... *H04L 5/0055* (2013.01); *H04L 1/1614* (2013.01); *H04L 1/1657* (2013.01);
(Continued)

(58) Field of Classification Search
USPC ........................................... 370/329
See application file for complete search history.

(56) References Cited

U.S. PATENT DOCUMENTS 9,686,064 B2 * 6/2017 He .......................... H04L 5/14
2012/0039279 A1   2/2012 Chen et al.
(Continued)

OTHER PUBLICATIONS

International Search Report and Written Opinion—PCT/US2018/050278—ISA/EPO—dated Nov. 29, 2018.

*Primary Examiner* — Phuongchau Ba Nguyen
(74) *Attorney, Agent, or Firm* — Harrity & Harrity, LLP

(57) ABSTRACT

Aspects of the present disclosure relate to wireless communication. In some aspects, a user equipment (UE) may receive a downlink grant that does not include a downlink assignment index (DAI); determine a pre-defined bundle window, associated with ACK/NACK multiplexing or bundling, based at least in part on receiving the downlink grant that does not include the DAI; and transmit ACK/NACK feedback to acknowledge or negatively acknowledge one or more downlink communications received in the pre-defined bundle window. In some aspects, a UE may receive a downlink grant that does not include a DAI; determine a bundle window, associated with ACK/NACK multiplexing or bundling, based at least in part on receiving the downlink grant that does not include the DAI, wherein the bundle window is not pre-defined; and transmit ACK/NACK feedback to acknowledge or negatively acknowledge one or more downlink communications received in the bundle window. Numerous other aspects are provided.

24 Claims, 18 Drawing Sheets

(51) Int. Cl.
*H04L 1/18* (2006.01)
*H04W 76/28* (2018.01)
*H04L 1/16* (2006.01)
*H04W 72/12* (2009.01)
*H04W 72/04* (2009.01)

(52) U.S. Cl.
CPC .......... *H04L 1/1812* (2013.01); *H04L 1/1854* (2013.01); *H04L 1/1861* (2013.01); *H04L 5/0053* (2013.01); *H04W 72/1294* (2013.01); *H04W 76/28* (2018.02); *H04L 1/1864* (2013.01); *H04W 72/0446* (2013.01)

(56) References Cited

U.S. PATENT DOCUMENTS

| | | | |
|---|---|---|---|
| 2012/0106569 A1* | 5/2012 | Che | H04L 1/1671 370/437 |
| 2013/0322304 A1* | 12/2013 | Yang | H04W 72/042 370/280 |
| 2015/0146643 A1* | 5/2015 | Fu | H04L 1/1607 370/329 |
| 2016/0242203 A1* | 8/2016 | You | H04L 5/0053 |
| 2019/0349937 A1* | 11/2019 | Kusashima | H04L 1/1812 |

\* cited by examiner

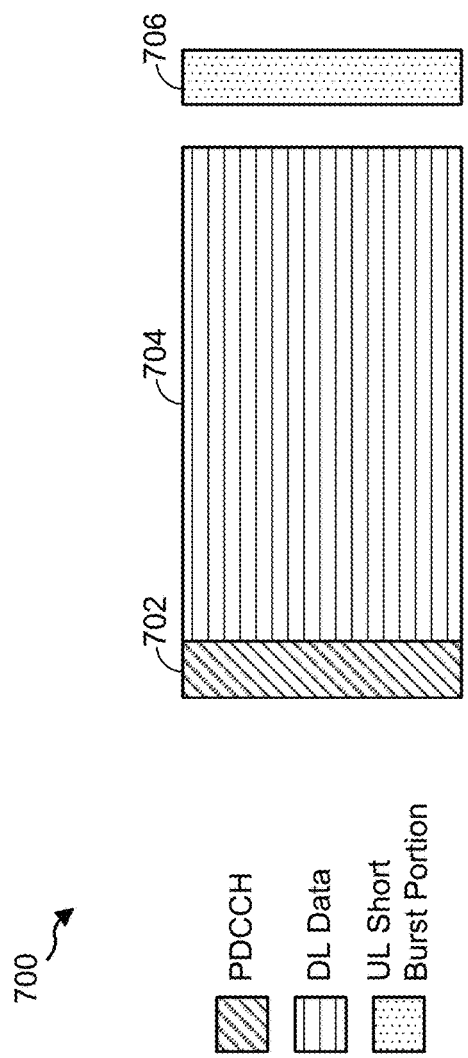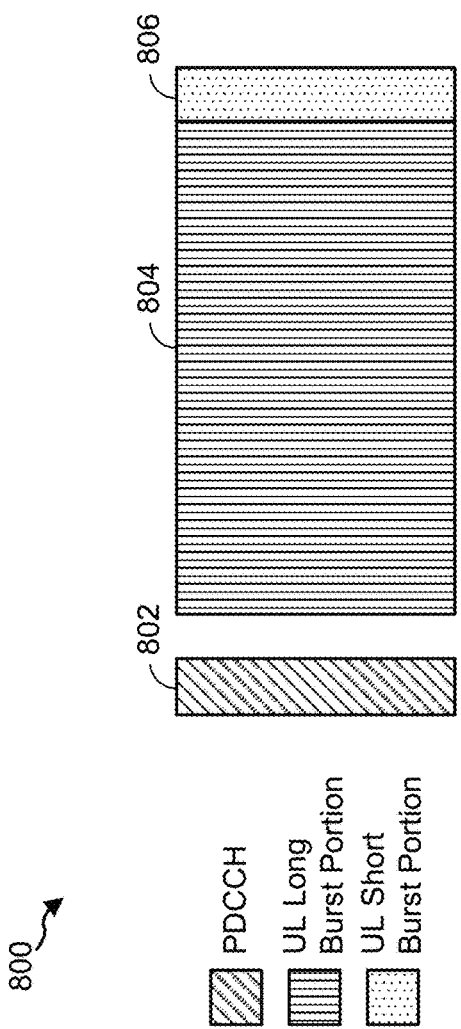

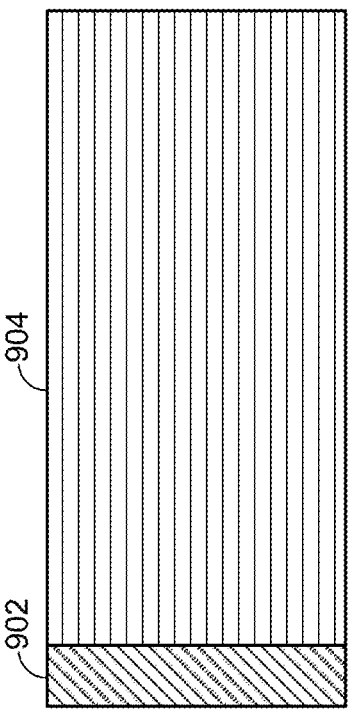
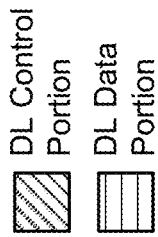
FIG. 9
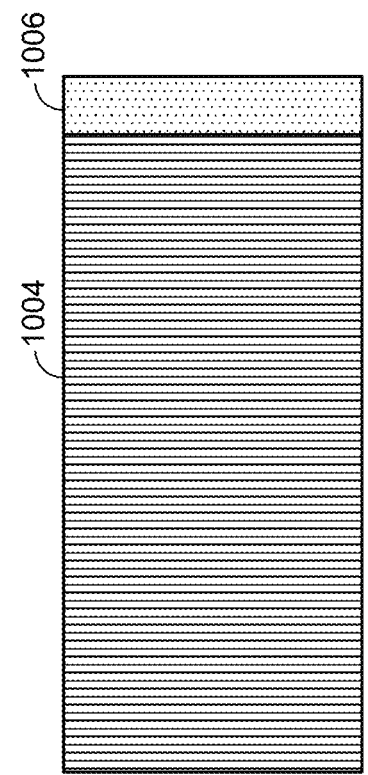
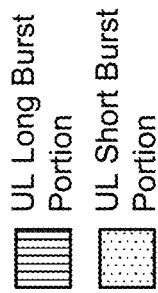
FIG. 10

TECHNIQUES AND APPARATUSES FOR HARQ-ACK TIMELINE INDICATION AND HARQ-ACK MULTIPLEXING AND BUNDLING IN NEW RADIO

CROSS-REFERENCE TO RELATED APPLICATIONS UNDER 35 U.S.C. § 119

This application claims priority to U.S. Provisional Patent Application No. 62/556,800, filed on Sep. 11, 2017, entitled "TECHNIQUES AND APPARATUSES FOR HARQ-ACK TIMELINE INDICATION AND HARQ-ACK MULTIPLEXING AND BUNDLING IN NEW RADIO," which is hereby expressly incorporated by reference herein.

FIELD OF THE DISCLOSURE

Aspects of the present disclosure generally relate to wireless communication, and more particularly to techniques and apparatuses for hybrid automatic repeat request acknowledgement (HARQ-ACK) timeline indication and HARQ-ACK multiplexing and bundling in New Radio.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method for wireless communication may be performed by a user equipment (UE). The method may include receiving downlink control information (DCI) that includes a field that explicitly or implicitly indicates a hybrid automatic repeat request acknowledgement (HARQ-ACK) timeline; determining a value of the field, wherein a first value of the field explicitly indicates the HARQ-ACK timeline and a second value of the field implicitly indicates the HARQ-ACK timeline according to a reference configuration; and transmitting acknowledgement/negative acknowledgement (ACK/NACK) feedback based at least in part on the HARQ-ACK timeline.

In some aspects, a user equipment for wireless communication may include memory and one or more processors operatively coupled to the memory. The memory and the one or more processors may be configured to receive downlink control information (DCI) that includes a field that explicitly or implicitly indicates a hybrid automatic repeat request acknowledgement (HARQ-ACK) timeline; determine a value of the field, wherein a first value of the field explicitly indicates the HARQ-ACK timeline and a second value of the field implicitly indicates the HARQ-ACK timeline according to a reference configuration; and transmit acknowledgement/negative acknowledgement (ACK/NACK) feedback based at least in part on the HARQ-ACK timeline.

In some aspects, a non-transitory computer-readable medium may store one or more instructions for wireless communication. The one or more instructions, when executed by one or more processors of a user equipment, may cause the one or more processors to receive downlink control information (DCI) that includes a field that explicitly or implicitly indicates a hybrid automatic repeat request acknowledgement (HARQ-ACK) timeline; determine a value of the field, wherein a first value of the field explicitly indicates the HARQ-ACK timeline and a second value of the field implicitly indicates the HARQ-ACK timeline according to a reference configuration; and transmit acknowledgement/negative acknowledgement (ACK/NACK) feedback based at least in part on the HARQ-ACK timeline.

In some aspects, an apparatus for wireless communication may include means for receiving downlink control information (DCI) that includes a field that explicitly or implicitly indicates a hybrid automatic repeat request acknowledgement (HARQ-ACK) timeline; means for determining a value of the field, wherein a first value of the field explicitly indicates the HARQ-ACK timeline and a second value of the field implicitly indicates the HARQ-ACK timeline according to a reference configuration; and means for transmitting acknowledgement/negative acknowledgement (ACK/NACK) feedback based at least in part on the HARQ-ACK timeline.

In some aspects, a method for wireless communication may be performed by a user equipment (UE). The method may include receiving a downlink grant that does not include a downlink assignment index (DAI); determining a pre-defined bundle window, associated with acknowledgement/negative acknowledgement (ACK/NACK) multiplexing or bundling, based at least in part on receiving the downlink grant that does not include the DAI; and transmitting ACK/NACK feedback to acknowledge or negatively acknowledge one or more downlink communications received in the pre-defined bundle window.

In some aspects, a user equipment for wireless communication may include memory and one or more processors operatively coupled to the memory. The memory and the one or more processors may be configured to receive a downlink grant that does not include a downlink assignment index (DAI); determine a pre-defined bundle window, associated with acknowledgement/negative acknowledgement (ACK/NACK) multiplexing or bundling, based at least in part on receiving the downlink grant that does not include the DAI; and transmit ACK/NACK feedback to acknowledge or negatively acknowledge one or more downlink communications received in the pre-defined bundle window.

In some aspects, a non-transitory computer-readable medium may store one or more instructions for wireless communication. The one or more instructions, when executed by one or more processors of a user equipment, may cause the one or more processors to receive a downlink grant that does not include a downlink assignment index (DAI); determine a pre-defined bundle window, associated with acknowledgement/negative acknowledgement (ACK/NACK) multiplexing or bundling, based at least in part on receiving the downlink grant that does not include the DAI; and transmit ACK/NACK feedback to acknowledge or negatively acknowledge one or more downlink communications received in the pre-defined bundle window.

In some aspects, an apparatus for wireless communication may include means for receiving a downlink grant that does not include a downlink assignment index (DAI); means for determining a pre-defined bundle window, associated with acknowledgement/negative acknowledgement (ACK/NACK) multiplexing or bundling, based at least in part on receiving the downlink grant that does not include the DAI; and means for transmitting ACK/NACK feedback to acknowledge or negatively acknowledge one or more downlink communications received in the pre-defined bundle window.

In some aspects, a method for wireless communication may be performed by a user equipment (UE). The method may include receiving a downlink grant that does not include a downlink assignment index (DAI); determining a bundle window, associated with acknowledgement/negative acknowledgement (ACK/NACK) multiplexing or bundling, based at least in part on receiving the downlink grant that does not include the DAI, wherein the bundle window is not pre-defined; and transmitting ACK/NACK feedback to acknowledge or negatively acknowledge one or more downlink communications received in the bundle window.

In some aspects, a user equipment for wireless communication may include memory and one or more processors operatively coupled to the memory. The memory and the one or more processors may be configured to receive a downlink grant that does not include a downlink assignment index (DAI); determine a bundle window, associated with acknowledgement/negative acknowledgement (ACK/NACK) multiplexing or bundling, based at least in part on receiving the downlink grant that does not include the DAI, wherein the bundle window is not pre-defined; and transmit ACK/NACK feedback to acknowledge or negatively acknowledge one or more downlink communications received in the bundle window.

In some aspects, a non-transitory computer-readable medium may store one or more instructions for wireless communication. The one or more instructions, when executed by one or more processors of a user equipment, may cause the one or more processors to receive a downlink grant that does not include a downlink assignment index (DAI); determine a bundle window, associated with acknowledgement/negative acknowledgement (ACK/NACK) multiplexing or bundling, based at least in part on receiving the downlink grant that does not include the DAI, wherein the bundle window is not pre-defined; and transmit ACK/NACK feedback to acknowledge or negatively acknowledge one or more downlink communications received in the bundle window.

In some aspects, an apparatus for wireless communication may include means for receiving a downlink grant that does not include a downlink assignment index (DAI); means for determining a bundle window, associated with acknowledgement/negative acknowledgement (ACK/NACK) multiplexing or bundling, based at least in part on receiving the downlink grant that does not include the DAI, wherein the bundle window is not pre-defined; and means for transmitting ACK/NACK feedback to acknowledge or negatively acknowledge one or more downlink communications received in the bundle window.

Aspects generally include a method, apparatus, system, computer program product, non-transitory computer-readable medium, user equipment, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 7 is a diagram illustrating an example of a downlink (DL)-centric subframe, in accordance with certain aspects of the present disclosure.

FIG. 8 is a diagram illustrating an example of an uplink (UL)-centric subframe, in accordance with certain aspects of the present disclosure.

FIG. 9 is a diagram illustrating an example of a full-DL or DL-only slot, in accordance with certain aspects of the present disclosure.

FIG. 10 is a diagram illustrating an example of a full-UL or UL-only slot, in accordance with certain aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
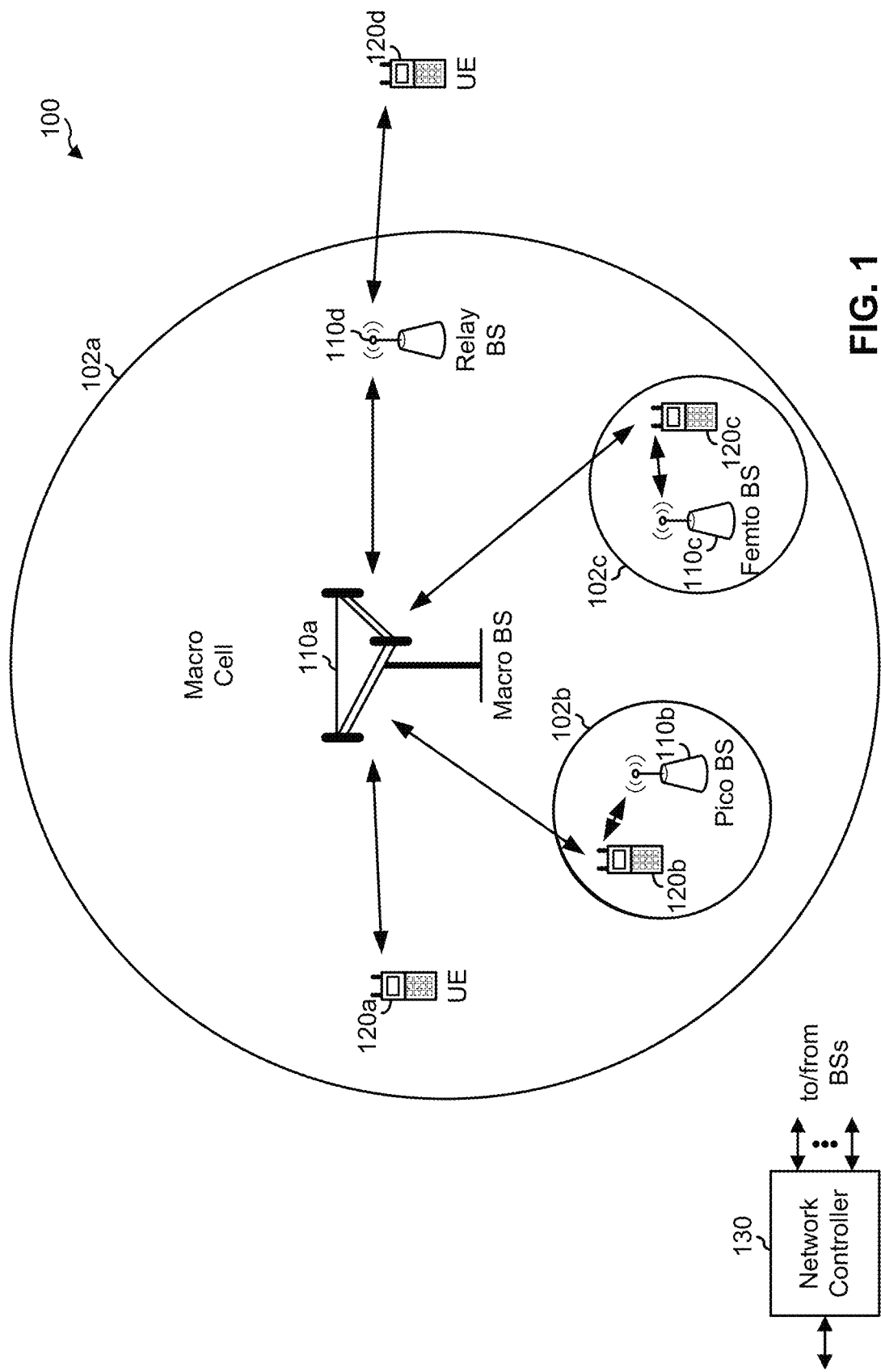
FIG. 1 is a block diagram conceptually illustrating an example of a wireless communication network, in accordance with certain aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples are possible and may differ from what was described with regard to FIG. 1.

Figure 2:
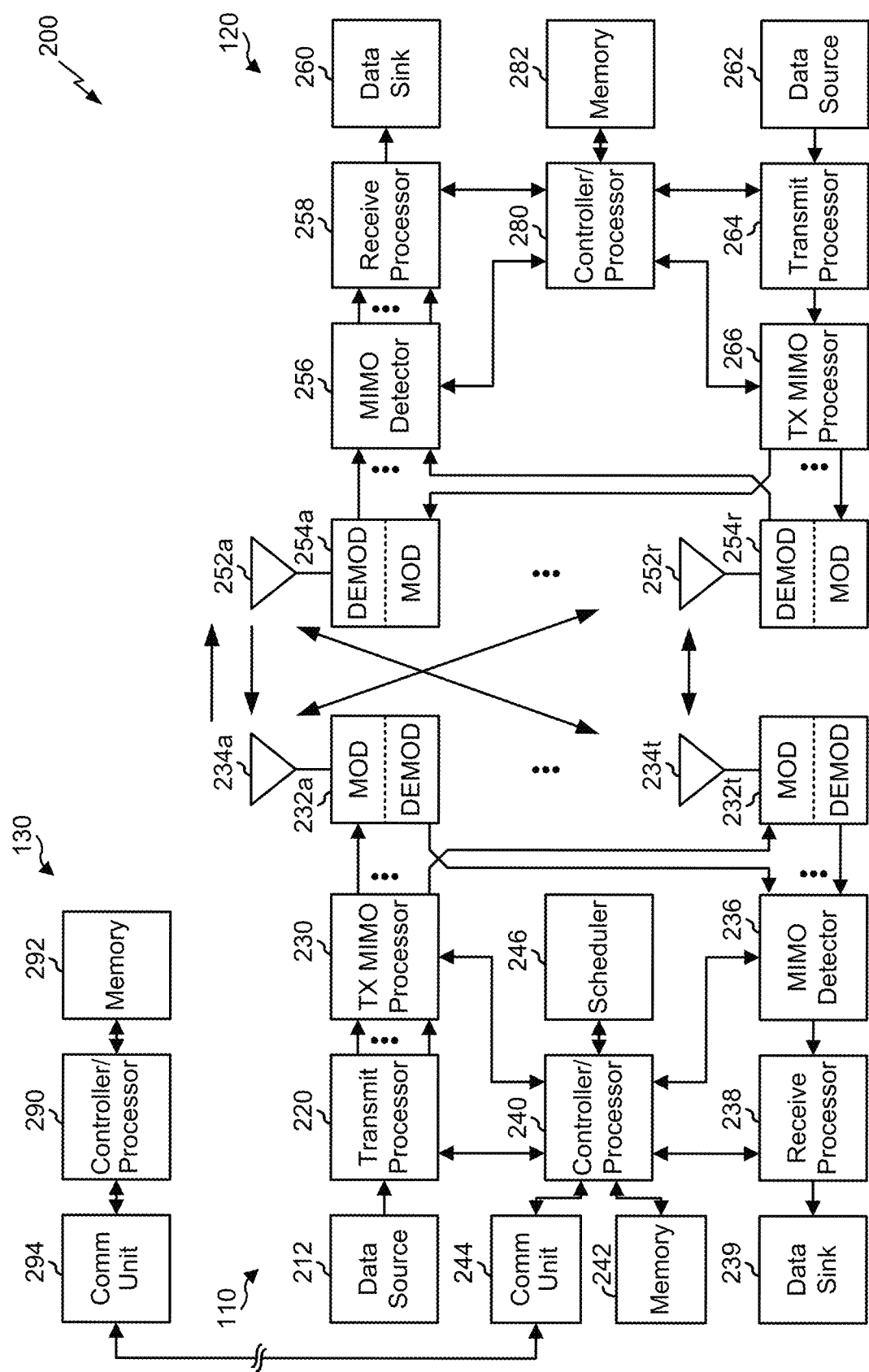
FIG. 2 is a block diagram conceptually illustrating an example of a base station in communication with a user equipment (UE) in a wireless communication network, in accordance with certain aspects of the present disclosure.

FIG. 2 shows a block diagram of a design of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to certain aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

In some aspects, one or more components of UE 120 may be included in a housing. Controllers/processors 240 and 280 and/or any other component(s) in FIG. 2 may direct the operation at base station 110 and UE 120, respectively, to perform HARQ-ACK timeline indication and HARQ-ACK multiplexing and bundling in New Radio. For example, controller/processor 280 and/or other processors and modules at UE 120, may perform or direct operations of UE 120 to perform HARQ-ACK timeline indication and HARQ-ACK multiplexing and bundling in New Radio. For example, controller/processor 280 and/or other controllers/processors and modules at UE 120 may perform or direct operations of, for example, process 1800 of FIG. 18, process 1900 of FIG. 19, process 2000 of FIG. 20, and/or other processes as described herein. In some aspects, one or more of the components shown in FIG. 2 may be employed to perform example process 1800, example process 1900, example process 2000, and/or other processes for the techniques described herein. Memories 242 and 282 may store data and program codes for base station 110 and UE 120, respectively. A scheduler 246 may schedule UEs for data transmission on the downlink and/or uplink.

In some aspects, UE 120 may include means for receiving DCI that includes a field that explicitly or implicitly indicates a HARQ-ACK timeline, means for determining a value of the field, means for transmitting ACK/NACK feedback based at least in part on the HARQ-ACK timeline, and/or the like. Additionally, or alternatively, UE 120 may include means for receiving a downlink grant that does not include a DAI, means for determining a pre-defined bundle window associated with ACK/NACK multiplexing or bundling, means for transmitting ACK/NACK feedback to acknowledge or negatively acknowledge one or more downlink communications received in the pre-defined bundle window, and/or the like. Additionally, or alternatively, UE 120 may include means for receiving a downlink grant that does not include a DAI, means for determining a bundle window that is not pre-defined, means for transmitting ACK/NACK feedback to acknowledge or negatively acknowledge one or more downlink communications received in the bundle window, and/or the like. In some aspects, such means may include one or more components of UE 120 described in connection with FIG. 2.

As indicated above, FIG. 2 is provided merely as an example. Other examples are possible and may differ from what was described with regard to FIG. 2.

Figure 3:
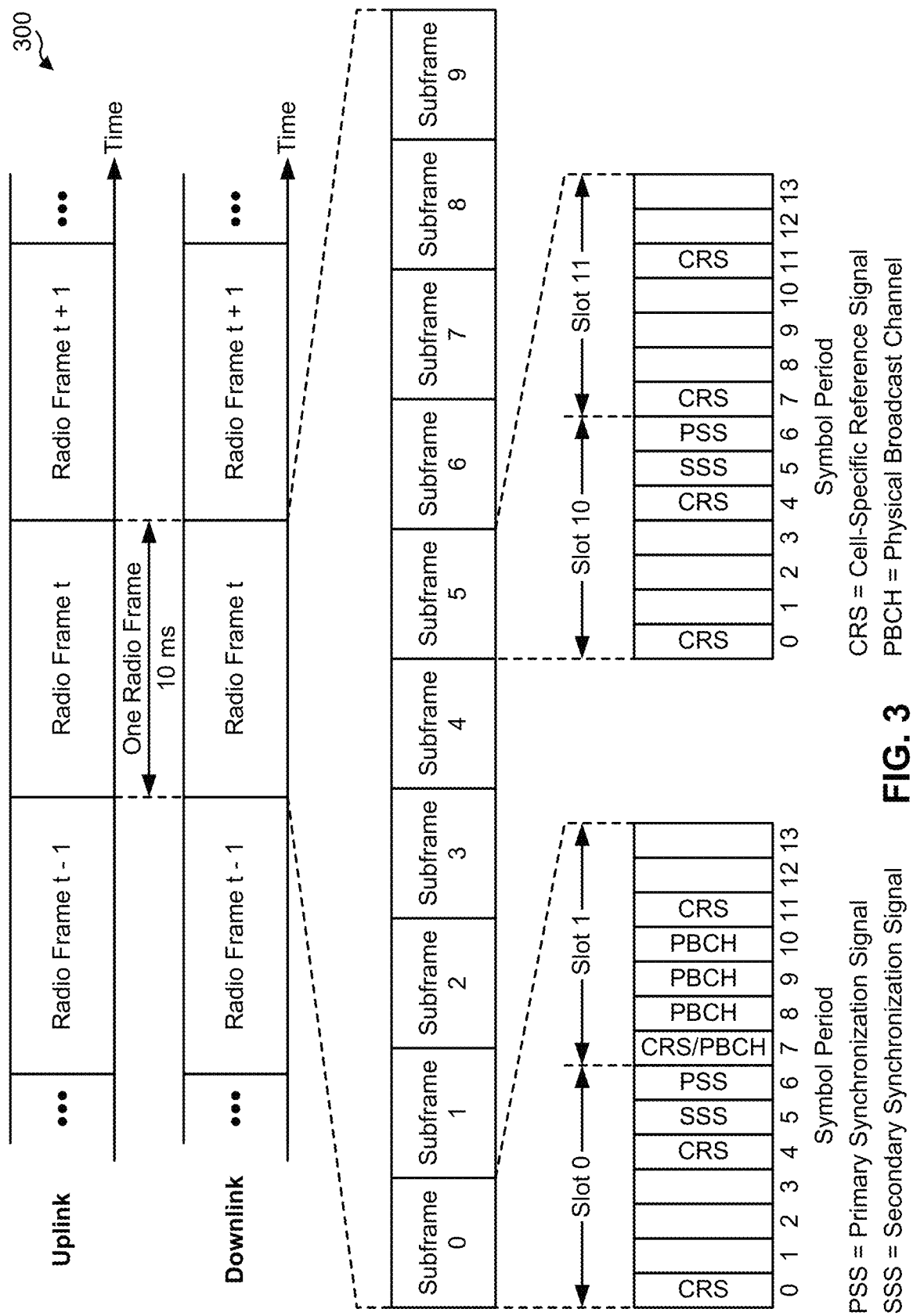
FIG. 3 is a block diagram conceptually illustrating an example of a frame structure in a wireless communication network, in accordance with certain aspects of the present disclosure.

FIG. 3 shows an example frame structure 300 for frequency division duplexing (FDD) in a telecommunications system (e.g., LTE). The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L-1.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol.

In certain telecommunications (e.g., LTE), a BS may transmit a primary synchronization signal (PSS) and a secondary synchronization signal (SSS) on the downlink in the center of the system bandwidth for each cell supported by the BS. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The BS may transmit a cell-specific reference signal (CRS) across the system bandwidth for each cell supported by the BS. The CRS may be transmitted in certain symbol periods of each subframe and may be used by the UEs to perform channel estimation, channel quality measurement, and/or other functions. The BS may also transmit a physical broadcast channel (PBCH) in symbol periods 0 to 3 in slot 1 of certain radio frames. The PBCH may carry some system information. The BS may transmit other system information such as system information blocks (SIBs) on a physical downlink shared channel (PDSCH) in certain subframes. The BS may transmit control information/data on a physical downlink control channel (PDCCH) in the first B symbol periods of a subframe, where B may be configurable for each subframe. The BS may transmit traffic data and/or other data on the PDSCH in the remaining symbol periods of each subframe.

In other systems (e.g., such NR or 5G systems), a Node B may transmit these or other signals in these locations or in different locations of the subframe.

As indicated above, FIG. 3 is provided merely as an example. Other examples are possible and may differ from what was described with regard to FIG. 3.

Figure 4:
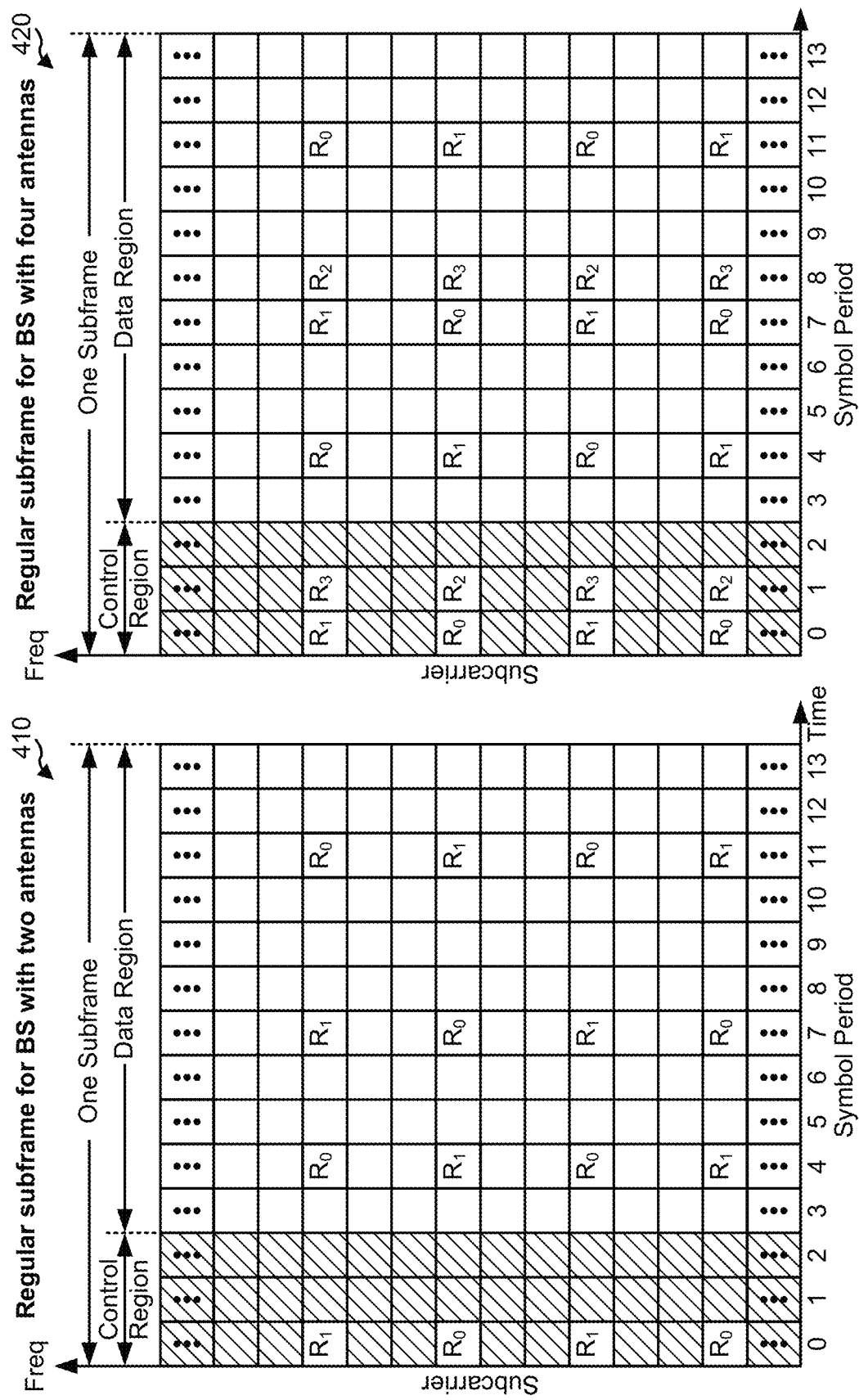
FIG. 4 is a block diagram conceptually illustrating two example subframe formats with the normal cyclic prefix, in accordance with certain aspects of the present disclosure.

FIG. 4 shows two example subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7, and 11. A reference signal is a signal that is known a priori by a transmitter and a receiver and may also be referred to as a pilot signal. A CRS is a reference signal that is specific for a cell, e.g., generated based at least in part on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used with four antennas. A CRS may be transmitted from antennas 0 and 1 in symbol periods 0, 4, 7, and 11 and from antennas 2 and 3 in symbol periods 1 and 8. For both subframe formats 410 and 420, a CRS may be transmitted on evenly spaced subcarriers, which may be determined based at least in part on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP Technical Specification (TS) 36.211, entitled "Evolved Universal Terrestrial Radio Access (E-UTRA); Physical Channels and Modulation," which is publicly available.

An interlace structure may be used for each of the downlink and uplink for FDD in certain telecommunications systems (e.g., LTE). For example, Q interlaces with indices of 0 through Q-1 may be defined, where Q may be equal to 4, 6, 8, 10, or some other value. Each interlace may include subframes that are spaced apart by Q frames. In particular, interlace q may include subframes q, q+Q, q+2Q, and/or the like, where $q \in \{0, \ldots, Q-1\}$.

The wireless network may support hybrid automatic retransmission request (HARQ) for data transmission on the downlink and uplink. For HARQ, a transmitter (e.g., a BS) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with LTE technologies, aspects of the present disclosure may be applicable with other wireless communication systems, such as NR or 5G technologies.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

A single component carrier bandwidth of 100 MHZ may be supported. NR resource blocks may span 12 sub-carriers with a sub-carrier bandwidth of 75 kilohertz (kHz) over a 0.1 ms duration. Each radio frame may include 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include downlink/uplink (DL/UL) data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

The RAN may include a central unit (CU) and distributed units (DUs). A NR BS (e.g., gNB, 5G Node B, Node B, transmit receive point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals. In some cases, DCells may transmit synchronization signals. NR BSs may transmit downlink signals to UEs indicating the cell type. Based at least in part on the cell type indication, the UE may communicate with the NR BS. For example, the UE may determine NR BSs to consider for cell selection, access, handover, and/or measurement based at least in part on the indicated cell type.

As indicated above, FIG. 4 is provided merely as an example. Other examples are possible and may differ from what was described with regard to FIG. 4.

Figure 5:
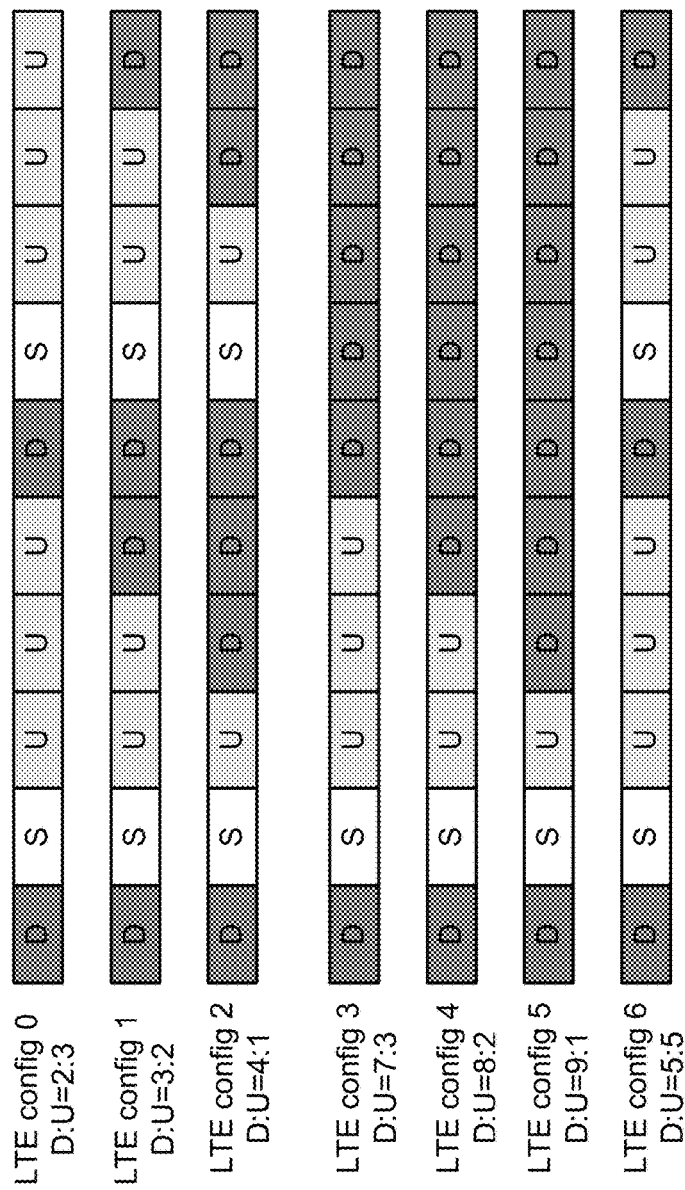
FIG. 5 illustrates LTE time-division duplexing (TDD) reference configurations that indicate a HARQ-ACK timeline, in accordance with certain aspects of the present disclosure.

FIG. 5 illustrates LTE time-division duplexing (TDD) reference configurations 500 that indicate a HARQ-ACK timeline, in accordance with certain aspects of the present disclosure.

In these reference configurations, a radio frame includes 10 subframes, and each subframe is configured as either a downlink subframe (shown as "D"), an uplink subframe (shown as "U"), or a special subframe (shown as "S"). In some aspects, a base station 110 may indicate to a UE 120 a reference configuration to be used, which defines the downlink, uplink, and special subframes in each radio frame. In this case, one or more uplink subframes may be used for transmission of ACK/NACK feedback (e.g., indicating whether one or more downlink communications were received) from the UE 120 to the base station 110. In some aspects, the one or more uplink subframes for ACK/NACK feedback may be fixed and/or pre-defined for a particular reference configuration.

As indicated above, FIG. 5 is provided merely as an example. Other examples are possible and may differ from what was described with regard to FIG. 5.

Figure 6:
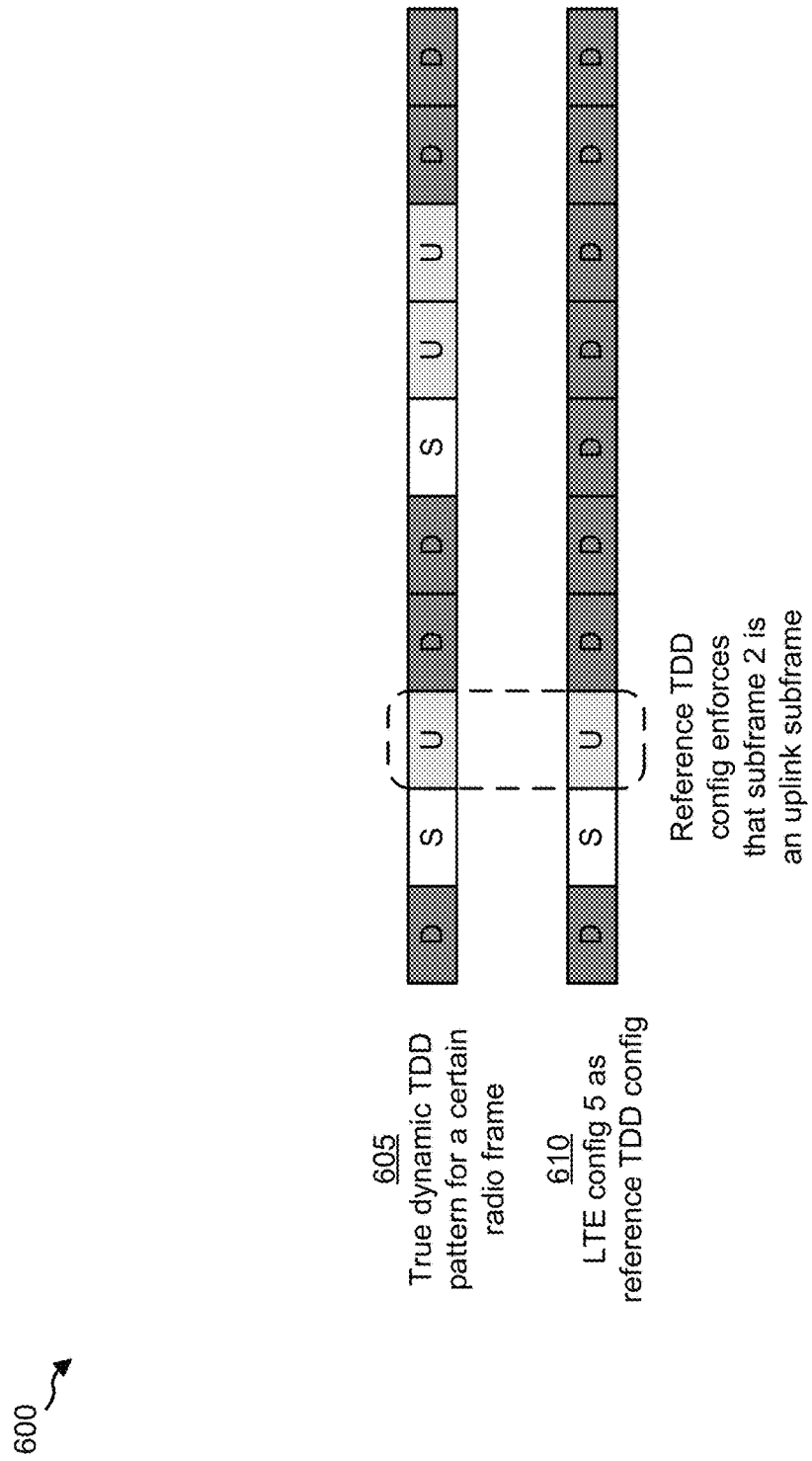
FIG. 6 illustrates an example of using an LTE TDD reference configuration to indicate a HARQ-ACK timeline during dynamically configured TDD, in accordance with certain aspects of the present disclosure.

FIG. 6 illustrates an example 600 of using an LTE TDD reference configuration to indicate a HARQ-ACK timeline during dynamically configured TDD, in accordance with certain aspects of the present disclosure.

In some aspects, a base station 110 may dynamically configure radio frames and/or subframes for a UE 120. This may result in reconfiguration of a subframe from an uplink subframe, capable of being used for ACK/NACK feedback, to a downlink subframe or a special subframe not capable of being used for ACK/NACK feedback. In this case, the UE 120 may use a reference configuration (e.g., one of the seven reference configurations shown in FIG. 5) to identify one or more uplink subframes to be used for ACK/NACK feedback. In some aspects, the base station 110 may indicate the reference configuration to be used to identify the one or more uplink subframes for ACK/NACK feedback. In this way, the UE 120 may identify an uplink subframe for transmission of ACK/NACK feedback even when radio frames are dynamically configured.

As shown by reference number 605, a dynamic TDD pattern may be configured for a radio frame. In the case of dynamic TDD configuration, the UE 120 may implicitly derive a subframe for ACK/NACK feedback of a downlink communication (e.g., a PDSCH communication) based at least in part on a reference TDD configuration (e.g., indicated by the base station 110). As shown by reference number 610, in example 600, the reference configuration is set to be LTE configuration 5. In this configuration, subframe number 2 is configured as the default uplink subframe for ACK/NACK feedback. In this way, the UE 120 can provide ACK/NACK feedback even when frames and/or subframes are dynamically reconfigured.

As indicated above, FIG. 6 is provided merely as an example. Other examples are possible and may differ from what was described with regard to FIG. 6.

FIG. 7 is a diagram 700 showing an example of a DL-centric subframe or wireless communication structure. The DL-centric subframe may include a control portion 702. The control portion 702 may exist in the initial or beginning portion of the DL-centric subframe. The control portion 702 may include various scheduling information and/or control information corresponding to various portions of the DL-centric subframe. In some configurations, the control portion 702 may be a physical DL control channel (PDCCH), as indicated in FIG. 7. In some aspects, the control portion 702 may include legacy PDCCH information, shortened PDCCH (sPDCCH) information), a control format indicator (CFI) value (e.g., carried on a physical control format indicator channel (PCFICH)), one or more grants (e.g., downlink grants, uplink grants, and/or the like), and/or the like.

The DL-centric subframe may also include a DL data portion 704. The DL data portion 704 may sometimes be referred to as the payload of the DL-centric subframe. The DL data portion 704 may include the communication resources utilized to communicate DL data from the scheduling entity (e.g., UE or BS) to the subordinate entity (e.g., UE). In some configurations, the DL data portion 704 may be a physical DL shared channel (PDSCH).

The DL-centric subframe may also include an UL short burst portion 706. The UL short burst portion 706 may sometimes be referred to as an UL burst, an UL burst portion, a common UL burst, a short burst, an UL short burst, a common UL short burst, a common UL short burst portion, and/or various other suitable terms. In some aspects, the UL short burst portion 706 may include one or more reference signals. Additionally, or alternatively, the UL short burst portion 706 may include feedback information corresponding to various other portions of the DL-centric subframe. For example, the UL short burst portion 706 may include feedback information corresponding to the control portion 702 and/or the data portion 704. Non-limiting examples of information that may be included in the UL short burst portion 706 include an ACK signal (e.g., a PUCCH ACK, a PUSCH ACK, an immediate ACK), a NACK signal (e.g., a PUCCH NACK, a PUSCH NACK, an immediate NACK), a scheduling request (SR), a buffer status report (BSR), a HARQ indicator, a channel state indication (CSI), a channel quality indicator (CQI), a sounding reference signal (SRS), a demodulation reference signal (DMRS), PUSCH data, and/or various other suitable types of information. The UL short burst portion 706 may include additional or alternative information, such as information pertaining to random access channel (RACH) procedures, scheduling requests, and various other suitable types of information.

As illustrated in FIG. 7, the end of the DL data portion 704 may be separated in time from the beginning of the UL short burst portion 706. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is merely one example of a DL-centric wireless communication structure, and alternative structures having similar features may exist without necessarily deviating from the aspects described herein.

As indicated above, FIG. 7 is provided merely as an example. Other examples are possible and may differ from what was described with regard to FIG. 7.

FIG. 8 is a diagram 800 showing an example of an UL-centric subframe or wireless communication structure. The UL-centric subframe may include a control portion 802. The control portion 802 may exist in the initial or beginning portion of the UL-centric subframe. The control portion 802 in FIG. 8 may be similar to the control portion 702 described above with reference to FIG. 7. The UL-centric subframe may also include an UL long burst portion 804. The UL long burst portion 804 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 802 may be a physical DL control channel (PDCCH).

As illustrated in FIG. 8, the end of the control portion 802 may be separated in time from the beginning of the UL long burst portion 804. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric subframe may also include an UL short burst portion 806. The UL short burst portion 806 in FIG. 8 may be similar to the UL short burst portion 706 described above with reference to FIG. 7, and may include any of the information described above in connection with FIG. 7. The foregoing is merely one example of an UL-centric wireless communication structure, and alternative structures having similar features may exist without necessarily deviating from the aspects described herein.

In one example, a wireless communication structure, such as a frame, may include both UL-centric subframes and DL-centric subframes. In this example, the ratio of UL-centric subframes to DL-centric subframes in a frame may be dynamically adjusted based at least in part on the amount of UL data and the amount of DL data that are transmitted. For example, if there is more UL data, then the ratio of UL-centric subframes to DL-centric subframes may be increased. Conversely, if there is more DL data, then the ratio of UL-centric subframes to DL-centric subframes may be decreased.

As indicated above, FIG. 8 is provided merely as an example. Other examples are possible and may differ from what was described with regard to FIG. 8.

FIG. 9 is a diagram 900 illustrating an example of a full-DL or DL-only slot or wireless communication structure. The full-DL slot may include the first portion and the second portion described above in connection with FIG. 7 (e.g., the DL control portion 702 and the DL data portion 704), shown as a DL control portion 902 and a DL data portion 904. The full-DL slot may exclude the third portion described above in connection with FIG. 7 (e.g., the UL short burst portion 706).

The DL control portion 902 may be located at the beginning of the full-DL slot. The DL control portion 902 may be used in a similar manner as the DL control portion 702 and/or the DL control portion 802, described above in connection with FIG. 7 and FIG. 8.

The DL data portion 904 may be located after the DL control portion 902 and at an end of the full-DL slot. The DL data portion 904 may be used in a similar manner as the DL data portion 704, described above in connection with FIG. 7.

As indicated above, FIG. 9 is provided merely as an example. Other examples are possible and may differ from what was described with regard to FIG. 9.

FIG. 10 is a diagram 1000 illustrating an example of a full-UL or UL-only slot or wireless communication structure. The full-UL slot may include the second portion and the third portion described above in connection with FIG. 8 (e.g., the UL long burst portion 804 and the UL short burst portion 806), shown as an UL long burst portion 1004 and an UL short burst portion 1006. The full-UL slot may exclude the first portion described above in connection with FIG. 8 (e.g., the DL control portion 802).

The UL long burst portion 1004 may be located at the beginning of the full-UL slot. The UL long burst portion 1004 may be used in a similar manner as the UL long burst portion 804, described above in connection with FIG. 8.

The UL short burst portion 1006 may be located after the UL long burst portion 1004 and at an end of the full-UL slot. The UL short burst portion 1006 may be used in a similar manner as the UL short burst portion 706 and/or the UL short burst portion 806, described above in connection with FIG. 7 and FIG. 8.

As indicated above, FIG. 10 is provided merely as an example. Other examples are possible and may differ from what was described with regard to FIG. 10.

In some aspects, a base station 110 may dynamically configure or reconfigure a subframe or slot type (e.g., among the options of a DL-centric slot type, an UL-centric slot type, a DL-only slot type, or an UL-only slot type, as described above). In some cases, this may result in a slot that includes an uplink portion (e.g., a DL-centric slot type, an UL-centric slot type, or an UL-only slot type) being reconfigured to a slot type that does not include an uplink portion (e.g., a DL-only slot type). If a UE 120 was scheduled to transmit ACK/NACK feedback in the slot, such transmission may not be possible if the slot is reconfigured to a slot type that does not include an uplink portion. Some techniques and apparatuses described herein address this issue using a fallback mechanism that uses an NR reference configuration to identify a slot for transmission of the ACK/NACK feedback, as described in more detail elsewhere herein.

Figure 11:
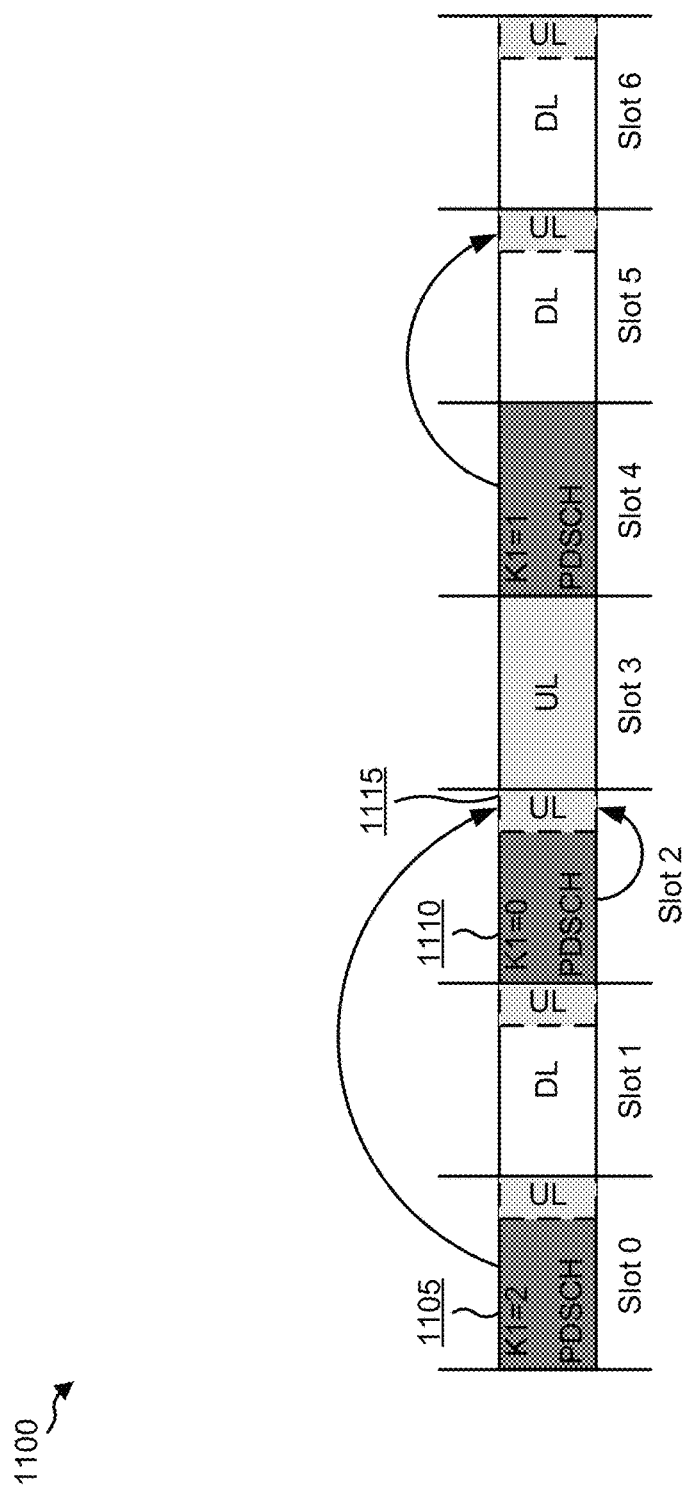
FIGS. 11-17 are diagrams illustrating examples relating to HARQ-ACK timeline indication and HARQ-ACK multiplexing and bundling in New Radio, in accordance with various aspects of the present disclosure.

FIG. 11 is a diagram illustrating an example 1100 relating to HARQ-ACK timeline indication and HARQ-ACK multiplexing and bundling in New Radio, in accordance with various aspects of the present disclosure.

In NR, a downlink grant may indicate a timing between downlink assignment (e.g., a slot in which the downlink grant is received) and a corresponding downlink communication (e.g., on the PDSCH). For example, this timing may be indicated by a field in DCI, and may be referred to as a K0 value. Similarly, an uplink grant may indicate a timing between uplink assignment and a corresponding uplink communication. Additionally, or alternatively, a downlink grant may indicate a timing between reception of a downlink communication (e.g., on the PDSCH) and a corresponding ACK/NACK indication (e.g., ACK/NACK feedback for the downlink communication). For example, this timing may be indicated by a field in DCI, and may be referred to as a K1 value.

As shown by reference number 1105, a downlink communication (e.g., a PDSCH communication), received by a UE 120 in slot 0, may be associated with a K1 value of 2. This K1 value may indicate a subsequent slot in which ACK/NACK feedback, corresponding to the downlink communication, is to be transmitted by the UE 120. For example, the K1 value of 2 indicates that the ACK/NACK feedback for the downlink communication is to occur 2 slots after the slot in which the downlink communication is received (e.g., 2 slots after slot 0). In this case, the downlink communication is received in slot 0, and the K1 value of 2 indicates that the ACK/NACK feedback for downlink communication is to occur in slot 2.

Similarly, as shown by reference number 1110, a downlink communication, received by the UE 120 in slot 2, may be associated with a K1 value of 0. This K1 value of 0 indicates that the ACK/NACK feedback for the downlink communication is to occur 0 slots after the slot in which the downlink communication is received (e.g., 0 slots after slot 2). In other words, a K1 value of 0 indicates that the ACK/NACK feedback for the downlink communication is to occur in the same slot as the downlink communication. In this case, the ACK/NACK feedback may be referred to as an immediate ACK/NACK because the ACK/NACK feedback occurs in the same slot as the corresponding downlink communication.

As shown by reference number 1115, the UE 120 may transmit ACK/NACK feedback, corresponding to the downlink communications received in both slot 0 and slot 2, in an uplink portion of slot 2. In some aspects, the ACK/NACK feedback may include multiplexed or bundled ACK/NACK indications (e.g., ACK/NACK bits), as described in more detail elsewhere herein.

In some aspects, only DCI (e.g., a downlink grant) is used to indicate the timing for HARQ-ACK feedback (e.g., the K1 value). However, this may result in wasted network resources due to unnecessary overhead because the value of K1 could potentially have a wide range of values, which would require a large bit-width in DCI to account for the wide range of values (e.g., 4 or 5 bits for 9 or 10 potential K1 values). Some techniques and apparatuses described herein permit more efficient indication of HARQ-ACK timing, thereby conserving network resources (e.g., by reducing the number of bits needed to indicate HARQ-ACK timing).

Furthermore, a base station 110 may reconfigure (e.g., overwrite) a slot type for a slot, which may render a UE 120 incapable of transmitting ACK/NACK feedback in the slot. For example, referring to FIG. 11, if slot 2 were overwritten to become a DL-only slot, then the UE 120 would not have an opportunity to transmit ACK/NACK feedback in slot 2. Some techniques and apparatuses described herein address this issue using a fallback mechanism that uses an NR reference configuration to identify a slot for transmission of the ACK/NACK feedback, as described in more detail elsewhere herein.

As indicated above, FIG. 11 is provided as an example. Other examples are possible and may differ from what was described with respect to FIG. 11.

Figure 12:
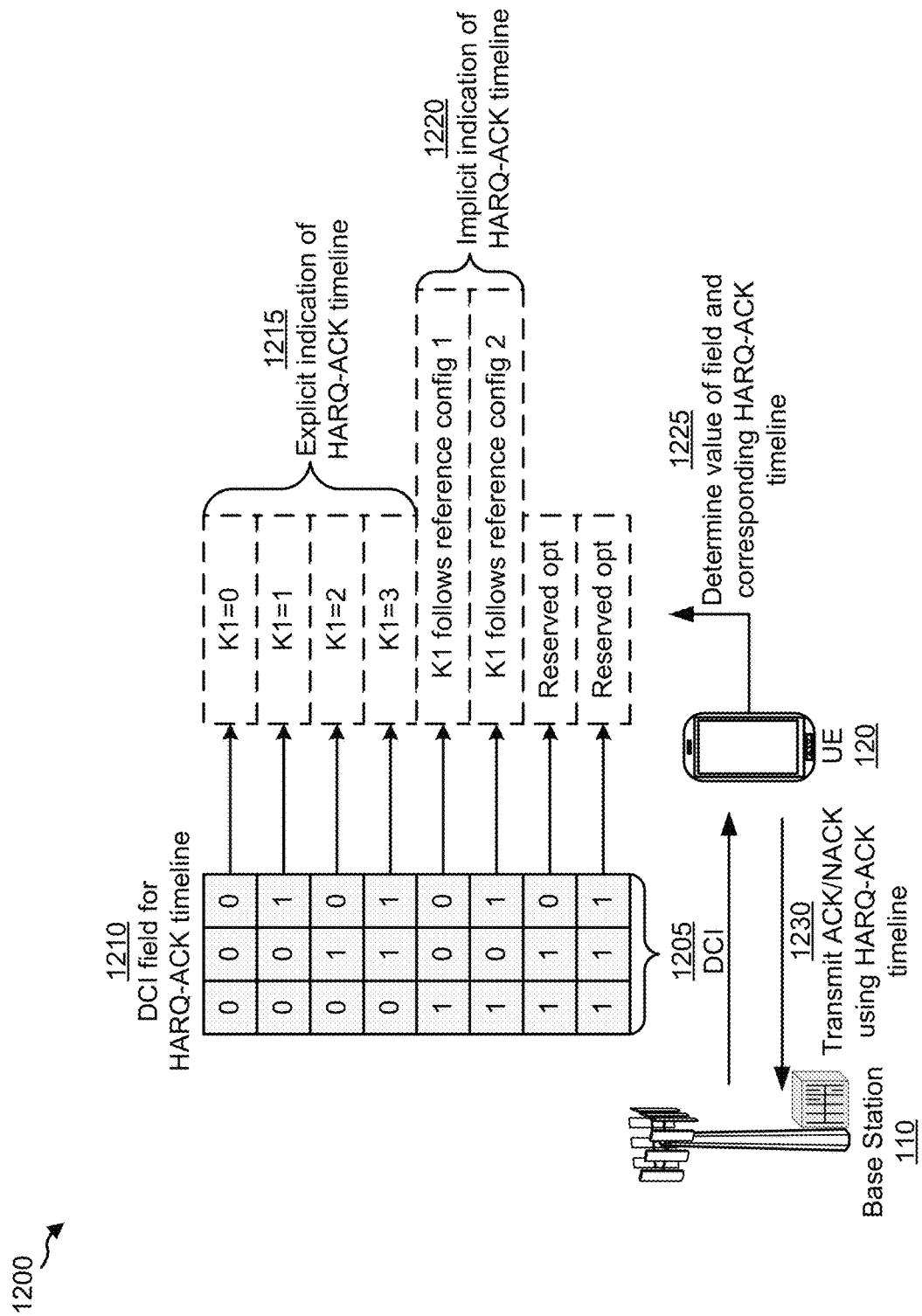

FIG. 12 is a diagram illustrating an example 1200 relating to HARQ-ACK timeline indication and HARQ-ACK multiplexing and bundling in New Radio, in accordance with various aspects of the present disclosure.

As shown by reference number 1205, a UE 120 may receive DCI from a base station 110. As shown by reference number 1210, the DCI may include a field that explicitly or implicitly indicates a HARQ-ACK timeline (e.g., a K1 value and/or a slot for transmission of ACK/NACK feedback corresponding to one or more downlink communications). In example 1200, the field is shown as having a length of 3 bits. In some aspects, other field lengths are possible (e.g., 2 bits, 4 bits, etc.).

As shown by reference number 1215, one or more first values of the field may explicitly indicate the HARQ-ACK timeline. For example, the one or more first values (e.g., shown as bit values of 000, 001, 010, and 011) may explicitly indicate a value of K1 (e.g., shown as values of 0, 1, 2, and 3) to be used for a downlink communication scheduled by the DCI (e.g., the downlink grant). In some aspects, different first values may indicate different K1 values.

As shown by reference number 1220, one or more second values of the field may implicitly indicate the HARQ-ACK timeline according to a reference configuration. For example, the one or more second values (e.g., shown as bit values of 100 and 101) may identify a reference configuration (e.g., an first NR reference configuration, a second NR reference configuration, and/or the like) to be used to determine a slot for transmission of ACK/NACK feedback for a downlink communication scheduled by the DCI (e.g., the downlink grant), in a similar manner as described in FIGS. 5 and 6 in connection with LTE reference configurations. In some aspects, different second values may indicate different reference configurations. In some aspects, the UE 120 may derive the K1 value from the indicated reference configuration. In some aspects, one or more third values of the field may be reserved for other options.

As shown by reference number 1225, the UE 120 may determine a value of the field, and may determine a HARQ-ACK timeline based at least in part on the value of the field. For example, the UE 120 may determine a slot for transmission of ACK/NACK feedback using a K1 value explicitly indicated by the field value, may determine a slot for transmission of ACK/NACK feedback by implicitly deriving a K1 value from a reference configuration indicated by the field value, and/or the like.

As shown by reference number 1230, the UE 120 may transmit ACK/NACK feedback based at least in part on the HARQ-ACK timeline. For example, the DCI may indicate a slot in which a downlink communication is to be transmitted, and may explicitly or implicitly indicate a HARQ-ACK timeline for the downlink communication. The UE 120 may use the HARQ-ACK timeline to identify a slot in which ACK/NACK feedback, corresponding to the downlink communication, is to be transmitted, and may transmit the ACK/NACK feedback in the identified slot.

In this way, network resources may be conserved by limiting the overhead used to indicate the HARQ-ACK timeline. For example, the overhead may be limited to 3 bits, as shown in FIG. 12, although a different number of bits may be used to indicate the HARQ-ACK timeline.

In some aspects, the base station 110 may reconfigure (e.g., overwrite) a slot type for a slot that is scheduled for transmission of ACK/NACK feedback. For example, the base station 110 may reconfigure the slot to a downlink-only slot (e.g., a full-downlink slot), thereby removing an opportunity for the UE 120 to transmit the ACK/NACK feedback in the slot. In this case, the UE 120 may use a default reference configuration to determine the HARQ-ACK timeline. The default reference configuration may be one of the reference configurations indicated in DCI, or may be a different reference configuration. In some aspects, the default reference configuration may be defined by a 3GPP standard. Additionally, or alternatively, the default reference configuration may be indicated to the UE 120 by the base station 110. For example, the default reference configuration may be indicated with an instruction to reconfigure a slot, may be indicated in a radio resource control (RRC) configuration message, may be indication in system information, and/or the like.

In some aspects, the UE 120 may receive an indication that a first slot, in which the UE 120 was instructed to transmit ACK/NACK feedback according to the HARQ-ACK timeline, has been reconfigured as a downlink-only slot (e.g., a slot that does not include any uplink portions). The UE 120 may receive the indication associated with the first slot, may determine that the UE 120 is scheduled to transmit ACK/NACK feedback in the first slot, and may identify a second slot to be used for ACK/NACK feedback according to the default reference configuration. The UE 120 may transmit the ACK/NACK feedback, originally scheduled for the first slot, in the second slot. In this way, the UE 120 may still transmit the ACK/NACK feedback despite the slot reconfiguration.

As indicated above, FIG. 12 is provided as an example. Other examples are possible and may differ from what was described with respect to FIG. 12.

Figure 13:
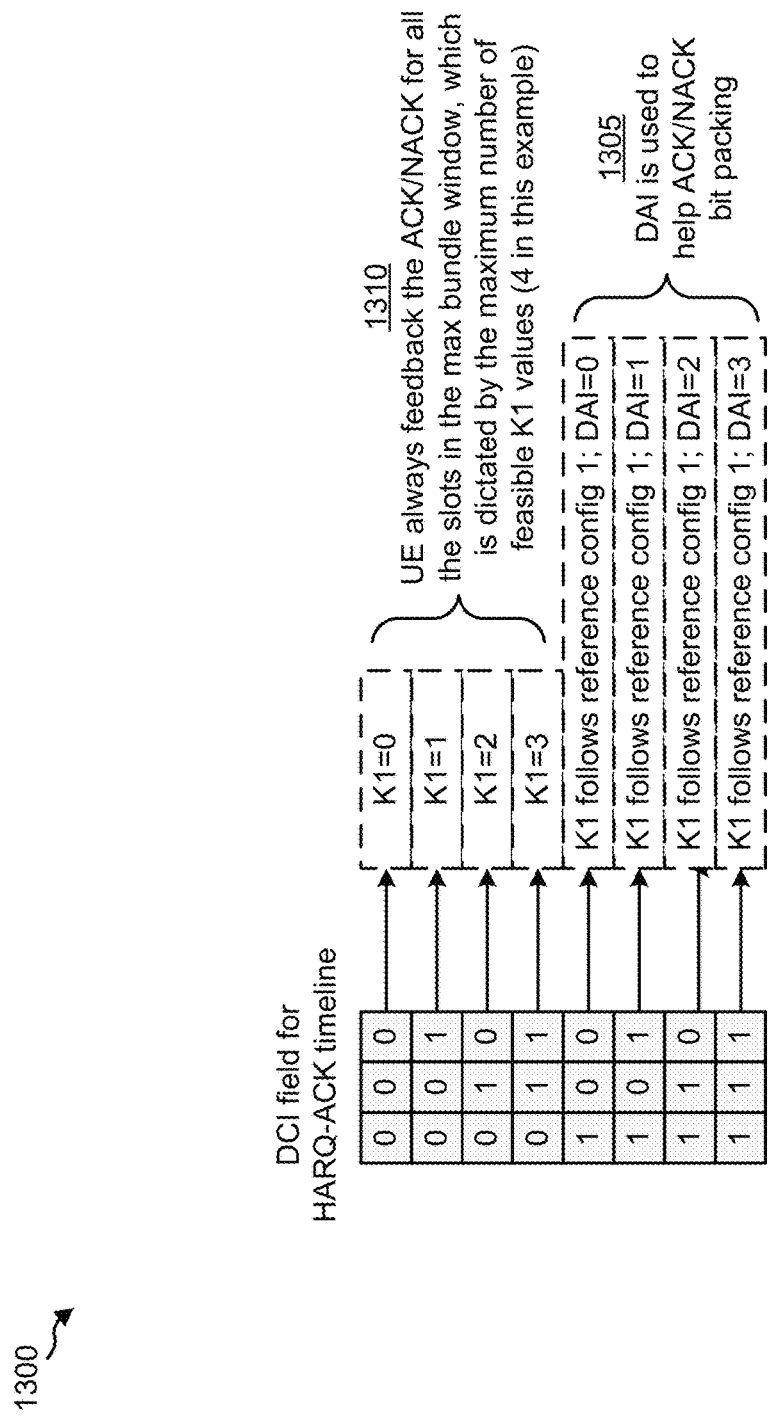

FIG. 13 is a diagram illustrating an example 1300 relating to HARQ-ACK timeline indication and HARQ-ACK multiplexing and bundling in New Radio, in accordance with various aspects of the present disclosure.

As shown by reference number 1305, the DCI field (e.g., as described above in connection with FIG. 12) may indicate a downlink assignment index (DAI) for ACK/NACK feedback. The DAI may be a counter that is incremented by the base station 110 for each downlink transmission scheduled for the UE 120. In some aspects, the base station 110 may indicate the last two bits (e.g., the two least significant bits) of the DAI to the UE 120 in DCI (e.g., in a downlink grant). For example, the DCI may include a DAI value of 0, 1, 2, or 3 (e.g., corresponding to bit values of 00, 01, 10, and 11, respectively), as shown.

In some aspects, the DAI may be indicated when the HARQ-ACK timeline is implicitly indicated in DCI (e.g., using a reference configuration), as shown. For example, one or more second values of the field (e.g., as described above in connection with FIG. 12) may indicate a reference configuration for ACK/NACK feedback and a DAI for the ACK/NACK feedback. In this case, different values of the field may correspond to the same reference configuration and different DAI values, as shown. In this way, the UE 120 may use the DAI to assist with ACK/NACK bit packing (e.g., ACK/NACK multiplexing or bundling). For example, the UE 120 may use the DAI to determine a plurality of ACK/NACK indications to be multiplexed or bundled in the ACK/NACK feedback.

As shown by reference number 1310, in some aspects, the UE 120 may determine a bundle window, associated with ACK/NACK multiplexing or bundling, based at least in part on a maximum bundle window size. In some aspects, the maximum bundle window size may correspond to the number of possible K1 values, which is 4 in example 1300. Additional details regarding determining a bundle window are described elsewhere herein.

As indicated above, FIG. 13 is provided as an example. Other examples are possible and may differ from what was described with respect to FIG. 13.

Figure 14:
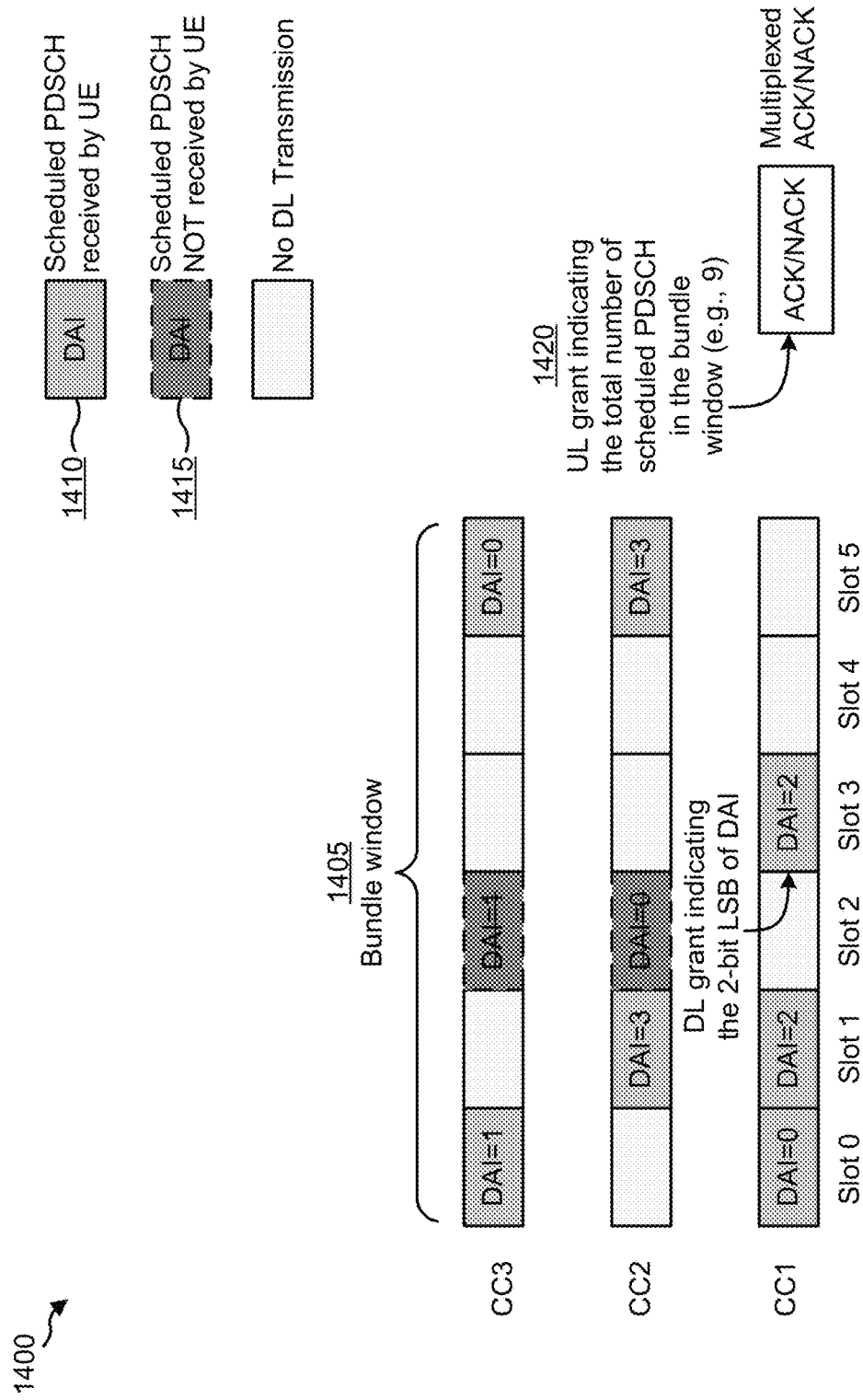

FIG. 14 is a diagram illustrating an example 1400 relating to HARQ-ACK timeline indication and HARQ-ACK multiplexing and bundling in New Radio, in accordance with various aspects of the present disclosure.

As shown by reference number 1405, a bundle window may include multiple scheduled downlink communications (e.g., PDSCH communications), including received downlink communications 1410 (e.g., scheduled PDSCH communications received by a UE 120) and unreceived downlink communications 1415 (e.g., scheduled PDSCH communications not received by the UE 120). A bundle window may be associated with ACK/NACK multiplexing and/or ACK/NACK bundling. For example, a bundle window may include a number of slots, where downlink communications received in those slots are to be acknowledged or negatively acknowledged together using ACK/NACK multiplexing and/or ACK/NACK bundling (e.g., in a same uplink transmission time interval, such as a slot or a portion of a slot).

In some aspects, ACK/NACK feedback may include multiplexed ACK/NACK indications corresponding to multiple downlink communications. In some aspects, ACK/NACK multiplexing may refer to using a one-to-one correspondence between the number of ACK/NACK indications (e.g., the number of ACK/NACK bits) and the number of downlink communications. In this case, each downlink communication has a corresponding ACK/NACK bit, and those ACK/NACK bits are multiplexed by transmitting the ACK/NACK bits in the same slot and/or the same portion of a slot.

In some aspects, ACK/NACK feedback may include bundled ACK/NACK indications corresponding to multiple downlink communications. In some aspects, ACK/NACK bundling may refer to using a one-to-many correspondence between an ACK/NACK indication (e.g., an ACK/NACK bit) and the downlink communications. In this case, one ACK/NACK bit may be used to ACK or NACK multiple downlink communications.

As further shown in FIG. 14, a base station 110 may use a DAI to keep track of downlink communications scheduled for a UE 120. As described above in connection with FIG. 13, the DAI may be a counter that is incremented by the base station 110 for each downlink transmission scheduled for the UE 120. In some aspects, the DAI may be incremented in a frequency-first, time-second manner, as described below. In some aspects, the base station 110 may indicate the last two bits (e.g., the two least significant bits) of the DAI to the UE 120 in DCI (e.g., in a downlink grant). Additionally, or alternatively, the base station 110 may indicate a total number of downlink communications scheduled for the UE 120 in an uplink grant for ACK/NACK feedback corresponding to the downlink communications (e.g., the total number of downlink communications scheduled in the bundle window that need to be acknowledged or negatively acknowledged by the UE 120 in ACK/NACK feedback corresponding to the uplink grant). In this way, the UE 120 can resolve missed downlink grants and/or unreceived downlink communications 1415.

As an example, in slot 0, the UE 120 may receive a first downlink (DL) communication on a first component carrier (CC1) and may receive a second DL communication on a third component carrier (CC3). The base station 110 may assign a DAI ending in 0 (e.g., bits 00) to the first DL communication, and may increment the DAI and assign the incremented DAI ending in 1 (e.g., bits 01) to the second DL communication. In slot 1, the UE 120 may receive a third DL communication on CC1 and may receive a fourth DL communication on a second component carrier (CC2). The base station 110 may increment the DAI and assign the incremented DAI ending in 2 (e.g., bits 10) to the third DL communication, and may increment the DAI and assign the incremented DAI ending in 3 (e.g., bits 11) to the fourth DL communication.

In slot 2, the UE 120 may miss a fifth DL communication on CC2, and may miss a sixth DL communication on CC3. The fifth DL communication may be assigned a DAI ending in 0, and the sixth DL communication may be assigned a DAI ending in 1. In slot 3, the UE 120 may receive a seventh DL communication assigned a DAI ending in 2. In some aspects, the DAI may be indicated to the UE 120 in a downlink grant that schedules the seventh DL communication. In this case, the UE 120 may use the DAI to determine that the UE 120 missed two DL communications and/or missed one or more DL grants for the two DL communications.

In slot 5, the UE 120 may receive an eighth DL communication on CC2, and may receive a ninth DL communication on CC3. The eighth DL communication may be assigned a DAI ending in 3, and the ninth DL communication may be assigned a DAI ending in 0. The bundle window may span slots 0 through 5.

As shown by reference number 1420, the UE 120 may receive an uplink grant for ACK/NACK feedback. In some aspects, the uplink grant may indicate the total number of scheduled downlink communications in the bundle window (e.g., in this case, 9).

In this way, the UE 120 may use the DAI in the downlink grants and may use the indication in the uplink grant to determine whether any downlink communications were missed by the UE 120, and to indicate the missed downlink communications in ACK/NACK feedback (e.g., which may be multiplexed or bundled for the bundle window). However, in some cases (e.g., in NR), the base station 110 may not indicate DAI in DCI. For example, rather than using a bundle window, HARQ-ACK timing may be dynamically indicated, as described above in connection with FIGS. 11-13. Additionally, or alternatively, HARQ-ACK timing may be overwritten, and/or a slot type may be reconfigured, creating additional challenges for ACK/NACK multiplexing and bundling. Some techniques and apparatuses described herein (e.g., in connection with FIGS. 15-17) assist with efficient ACK/NACK multiplexing and/or bundling when the DAI is not indicated in a downlink grant (e.g., in DCI).

As indicated above, FIG. 14 is provided as an example. Other examples are possible and may differ from what was described with respect to FIG. 14.

Figure 15:
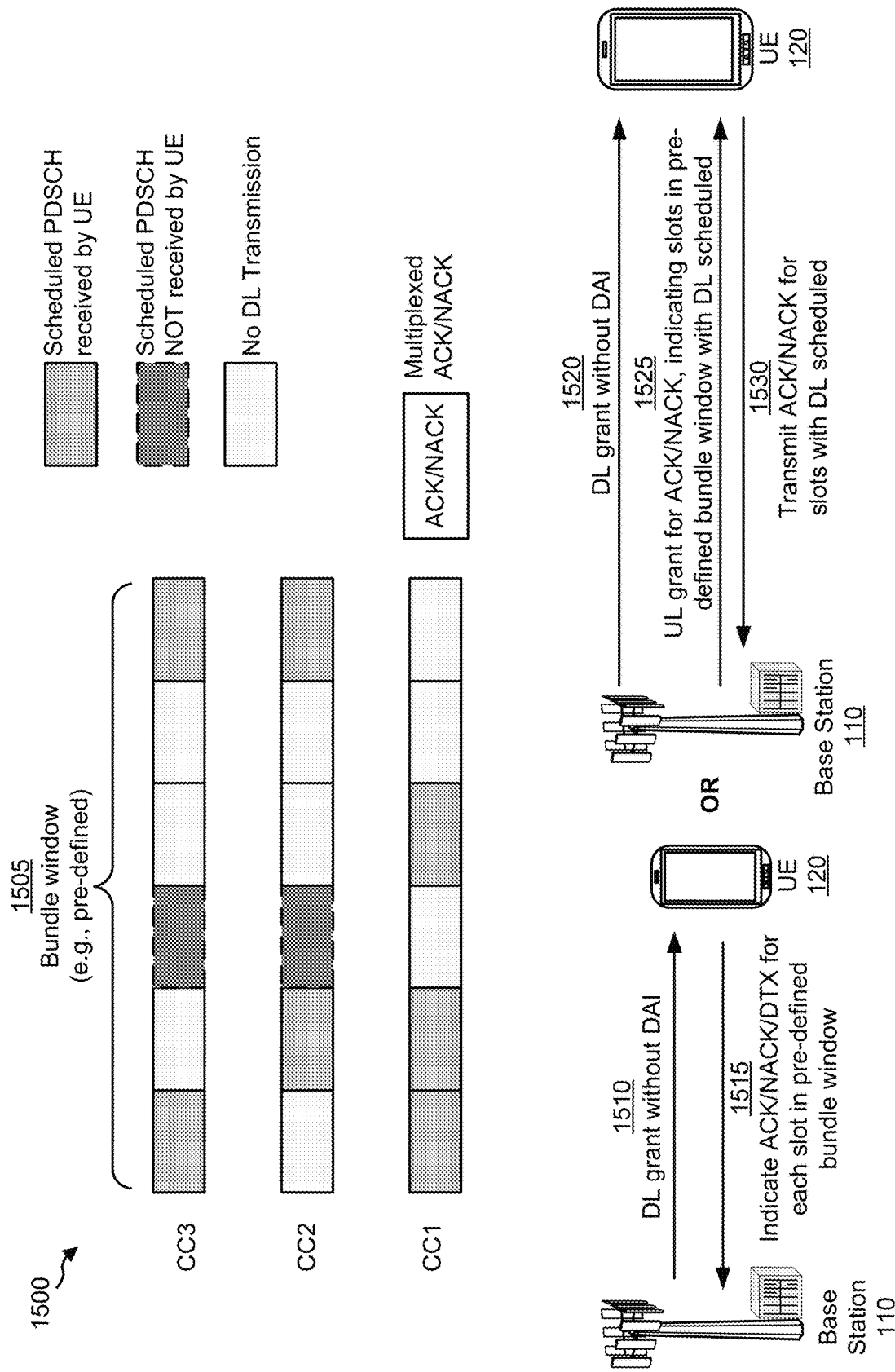

FIG. 15 is a diagram illustrating an example 1500 relating to HARQ-ACK timeline indication and HARQ-ACK multiplexing and bundling in New Radio, in accordance with various aspects of the present disclosure.

FIG. 15 illustrates various techniques for ACK/NACK feedback when a bundle window is pre-defined and a downlink grant does not include a DAI. In these cases, a UE 120 may receive a downlink grant that does not include a DAI, and may determine a pre-defined bundle window associated with ACK/NACK multiplexing or bundling. In some aspects, the UE 120 may determine the pre-defined bundle window based at least in part on receiving the downlink grant that does not include the DAI. The UE 120 may transmit ACK/NACK feedback to acknowledge or negatively acknowledge one or more downlink communications received in the pre-defined bundle window. Additional details are provided below.

As shown by reference number 1505, in some aspects, a bundle window may be pre-defined. For example, the bundle window may be defined as per a 3GPP specification (e.g., for NR). A pre-defined bundle window may define a bundle window for each ACK/NACK feedback, which may be a fixed number of slots (e.g., 5 prior slots, 10 prior slots, 20 prior slots, etc.).

As shown by reference number 1510, in some aspects, a UE 120 may receive, from a base station 110, a downlink grant that does not include a DAI. When the downlink grant does not include DAI, then the UE 120 may not be able to determine for which slots a downlink communication was scheduled, and may thus not be able to detect missed downlink communications. In this case, even if an uplink grant specifies the total number of scheduled downlink communications for the bundle window, the UE 120 would still be unable to determine which of the scheduled downlink communications were missed by the UE 120. Techniques described below overcome this issue. These techniques may permit the UE 120 to determine a pre-defined bundle window associated with ACK/NACK multiplexing or bundling (e.g., based at least in part on receiving the downlink grant without DAI), and to transmit ACK/NACK feedback to acknowledge or negatively acknowledge one or more downlink communications received in the pre-defined bundle window.

For example, as shown by reference number 1515, the UE 120 may transmit ACK/NACK feedback that indicates an ACK, a NACK, or discontinuous transmission (DTX) for each slot included in the pre-defined bundle window. For example, the UE 120 may receive an uplink grant for ACK/NACK feedback, and may determine a pre-defined bundle window associated with the uplink grant (e.g., associated with an uplink slot scheduled for ACK/NACK feedback by the uplink grant). For each slot included in the pre-defined bundle window (e.g., for each slot on a single component carrier or for each combination of slot and frequency across multiple components carriers), the UE 120 may indicate an ACK (e.g., indicating that the UE 120 received a DL communication in the slot), a NACK (e.g., indicating that the UE 120 did not receive a DL communication in the slot), or DTX (e.g., indicating that the UE 120 was muted during the slot). This technique may have high uplink overhead, but may conserve downlink resources.

As another example, and as shown by reference numbers 1520 and 1525, the UE 120 may receive, from a base station 110, a downlink grant that does not include a DAI, and may also receive an uplink grant for the ACK/NACK feedback. The uplink grant may indicate one or more slots in the pre-defined bundle window in which one or more downlink communications were scheduled. In some aspects, the uplink grant may include a bitmap that indicates, for each slot in the bundle window and/or each combination of slot and frequency for multiple CCs, whether a downlink communication was scheduled for each slot and/or each combination of slot and frequency. Additionally, or alternatively, the uplink grant may include an index corresponding to a pre-defined slot pattern. For example, multiple slot patterns (e.g., for slots on a single CC or combinations of slots and frequencies on multiple CCs) may be defined that indicate which slots have scheduled downlink communications in the pre-defined bundle window, and the UE 120 may receive an index that identifies one of the slot patterns. These techniques may have high downlink overhead, but may conserve uplink resources.

In this way, the UE 120 may be capable of providing accurate ACK/NACK feedback when a downlink grant does not include DAI and a bundle window is pre-defined (e.g., according to a 3GPP specification).

As indicated above, FIG. 15 is provided as an example. Other examples are possible and may differ from what was described with respect to FIG. 15.

Figure 16:
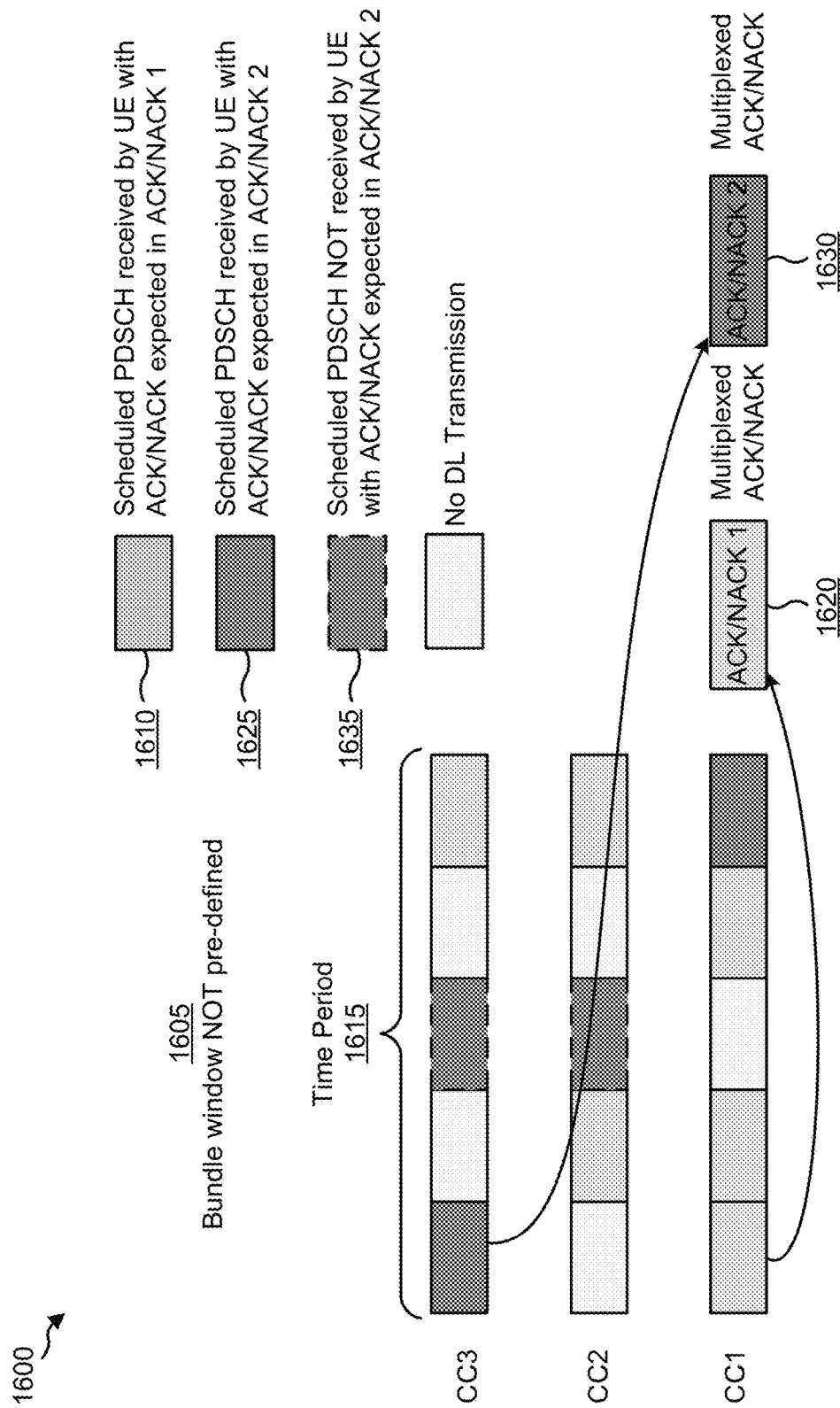

FIG. 16 is a diagram illustrating an example 1600 relating to HARQ-ACK timeline indication and HARQ-ACK multiplexing and bundling in New Radio, in accordance with various aspects of the present disclosure.

As shown by reference number 1605, in some aspects, a bundle window may not be pre-defined. For example, the bundle window may be not be defined in a 3GPP specification (e.g., for NR), the bundle window may not be fixed in size, HARQ-ACK timing may be dynamically indicated in DCI, and/or the like.

For example, and as shown, ACK/NACK indications for a first set of DL communications 1610 received by a UE 120 in a time period 1615 may be multiplexed or bundled in first ACK/NACK feedback 1620, and ACK/NACK indications for a second set of DL communications 1625 received by the UE 120 in the time period 1615 may be multiplexed or bundled in second ACK/NACK feedback 1630. As shown, DL communications from the first set of DL communications 1610 and the second set of DL communications 1625 may be intermingled in time (e.g., one or more communications from the second set of DL communications 1625 may be received before one or more communications from the first set of DL communications 1610).

As further shown, the UE 120 may miss one or more DL communications 1635 in the time period 1615. In the example shown in FIG. 16, ACK/NACK indications for the missed DL communications 1635 are expected to be included in the second ACK/NACK feedback 1630. In this case, if a DAI is not indicated in downlink grants, and a bundle window is not pre-defined, the UE 120 may not be able to determine and/or indicate which DL communications were missed. Even if the UE 120 infers that a start of a bundle window for an uplink slot for ACK/NACK feedback is the earliest slot in which a DL communication is scheduled with a timing indication (e.g., K1) that points to the uplink slot, the UE 120 may not be able to determine whether the DL communication is actually the earliest DL communication (e.g., the UE 120 may have missed an earlier DL communication that points to the uplink slot for ACK/NACK feedback). Techniques described below in connection with FIG. 17 overcome this issue.

As indicated above, FIG. 16 is provided as an example. Other examples are possible and may differ from what was described with respect to FIG. 16.

Figure 17:
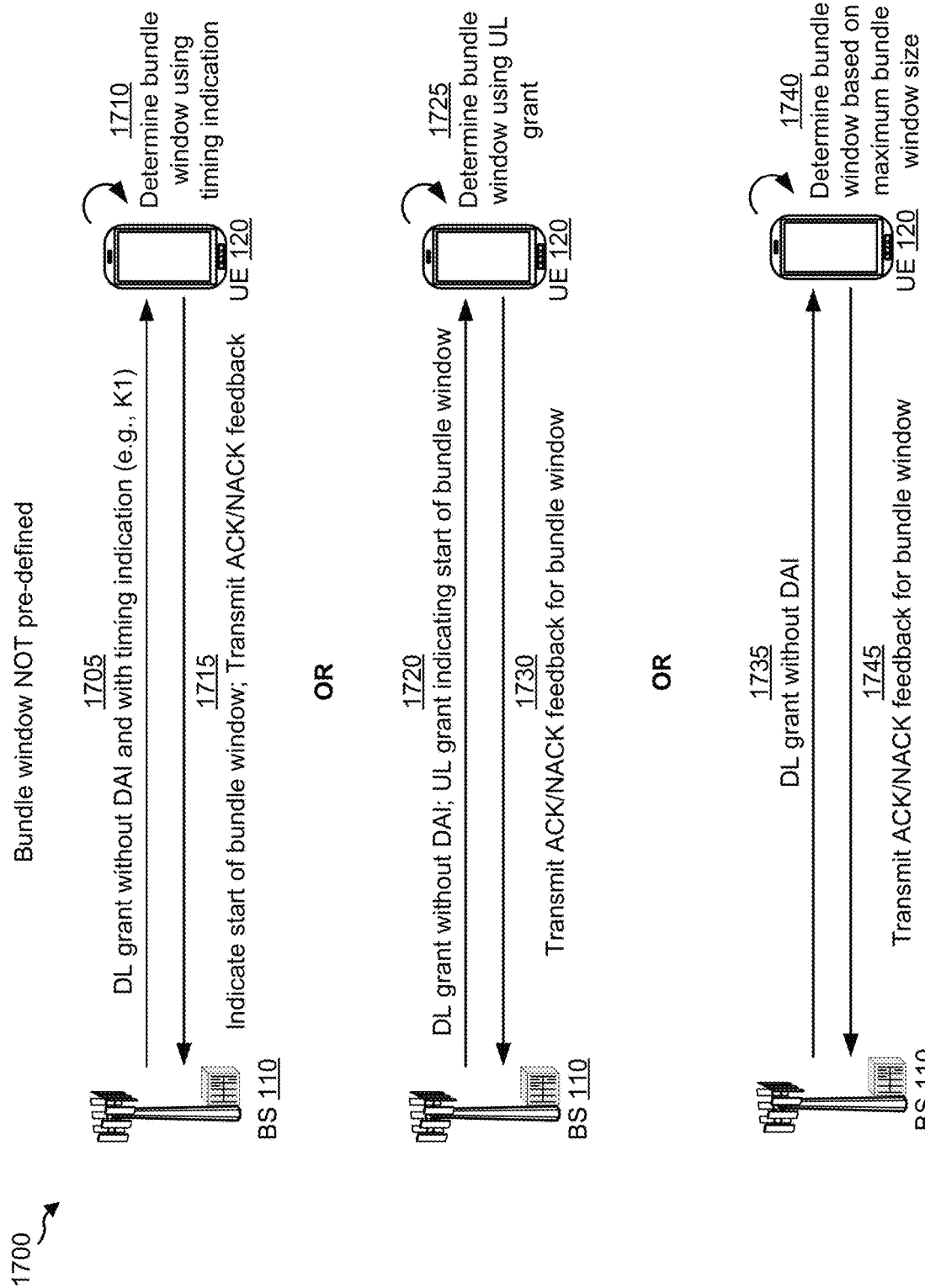

FIG. 17 is a diagram illustrating an example 1700 relating to HARQ-ACK timeline indication and HARQ-ACK multiplexing and bundling in New Radio, in accordance with various aspects of the present disclosure.

FIG. 17 illustrates various techniques for ACK/NACK feedback when a bundle window is not pre-defined and a downlink grant does not include a DAI. In these cases, a UE 120 may receive a downlink grant that does not include a DAI, and may determine a bundle window associated with ACK/NACK multiplexing or bundling. The bundle window may not be pre-defined. In some aspects, the UE 120 may determine the bundle window based at least in part on receiving the downlink grant that does not include the DAI. The UE 120 may transmit ACK/NACK feedback to acknowledge or negatively acknowledge one or more downlink communications received in the bundle window. Additional details are provided below.

As shown by reference number 1705, a UE 120 may receive a downlink grant from a base station 110. The downlink grant may not include DAI, and may include a timing indication (e.g., a K1 value). The timing indication may indicate HARQ-ACK timing (e.g., a number of slots between reception of a downlink communication and an ACK/NACK indication corresponding to the downlink communication). As shown by reference number 1710, the UE 120 may determine the bundle window based at least in part on the timing indication. For example, the timing indication may indicate the start of the bundle window. As shown by reference number 1715, the UE 120 may indicate the start of the bundle window to the base station 110. In some aspects, the UE 120 may indicate the start of the bundle window in a separately coded channel. Additionally, or alternatively, the UE 120 may transmit ACK/NACK feedback for DL communications received in the bundle window. In this way, the base station 110 may be capable of detecting whether the UE 120 missed a DL communication. For example, if the indicated start of the bundle window does not match a start of the bundle window stored by the base station 110, then this may indicate that the UE 120 missed a DL communication earlier in time than the start indicated by the UE 120.

As shown by reference number 1720, the UE 120 may receive a downlink grant that does not include a DAI, and may receive an uplink grant, for ACK/NACK feedback, that indicates a start of the bundle window. As shown by reference number 1725, the UE 120 may determine the bundle window based at least in part on the uplink grant (e.g., the indication in the uplink grant). In some aspects, the bundle window may start at a slot indicated in the uplink grant, and may end at a slot prior to (e.g., immediately prior to, a fixed number of slots prior to, and/or the like) the uplink slot used for ACK/NACK feedback. Additionally, or alternatively, the bundle window may end at the uplink slot itself (e.g., in the case of a DL-centric slot with an uplink portion). As shown by reference number 1730, the UE 120 may transmit ACK/NACK feedback for DL communications received in the bundle window. By indicating the start of the bundle window, the base station 110 may be capable of detecting whether the UE 120 missed a DL communication in the bundle window because the UE 120 and the base station 110 are using the same bundle window.

As shown by reference number 1735, the UE 120 may receive a downlink grant that does not include a DAI. As shown by reference number 1740, the UE 120 may determine the bundle window based at least in part on a maximum bundle window size. In some aspects, the maximum bundle window size may correspond to a maximum timing indication value (e.g., a maximum K1 value) and/or a maximum number of possible timing indication values (e.g., a number of possible K1 values). As shown by reference number 1745, the UE 120 may transmit ACK/NACK feedback for DL communications received in the bundle window. By using the maximum bundle window size, the base station 110 may be capable of detecting whether the UE 120 missed a DL communication in the bundle window because the UE 120 and the base station 110 are using the same bundle window (e.g., with a size equal to the maximum bundle window size).

As indicated above, FIG. 17 is provided as an example. Other examples are possible and may differ from what was described with respect to FIG. 17.

Figure 18:
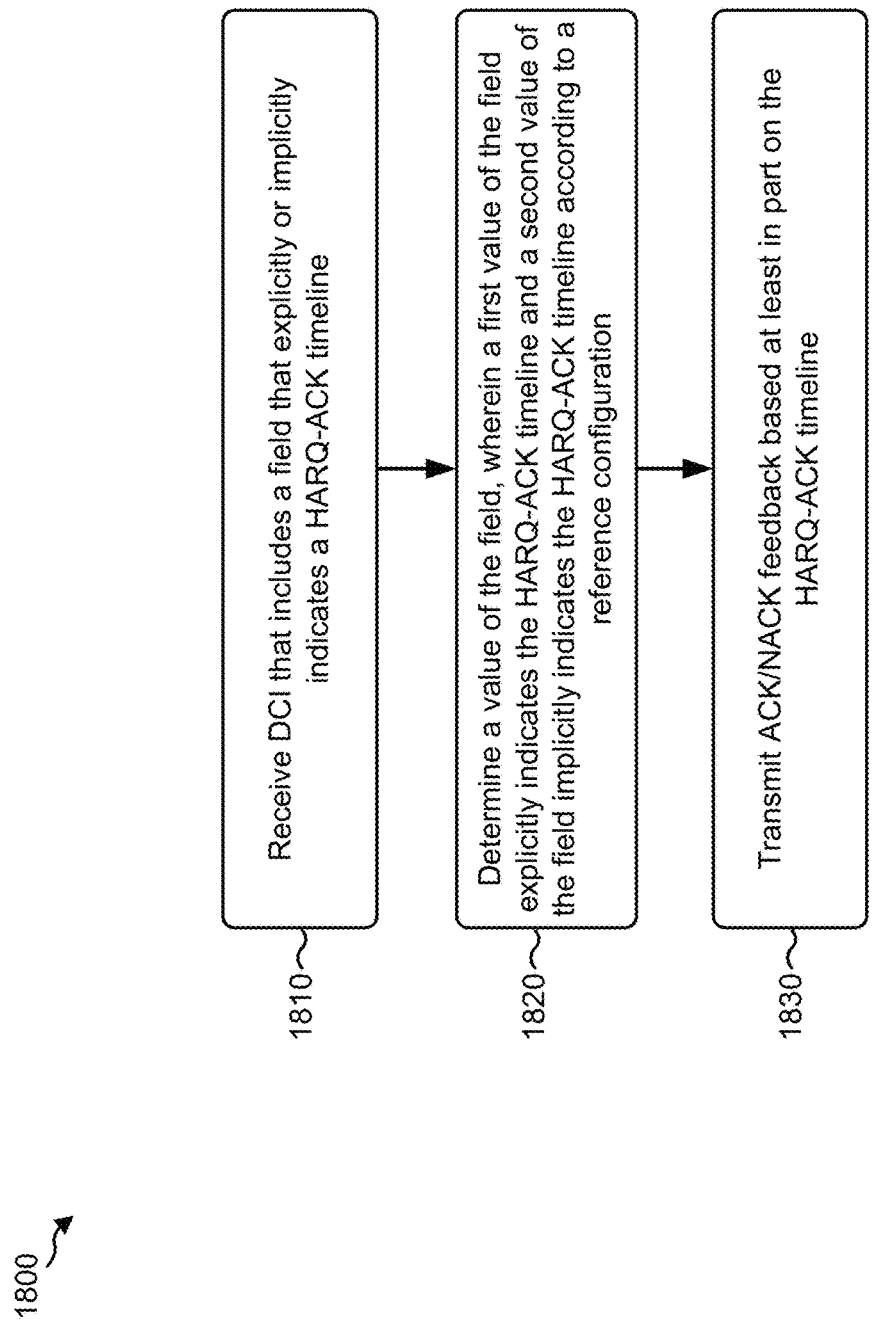
FIGS. 18-20 are diagrams illustrating example processes performed, for example, by a user equipment, in accordance with various aspects of the present disclosure.

FIG. 18 is a diagram illustrating an example process 1800 performed, for example, by a UE, in accordance with various aspects of the present disclosure. Example process 1800 is an example where a UE (e.g., UE 120 and/or the like) performs HARQ-ACK timeline indication and/or HARQ-ACK multiplexing and bundling in New Radio.

As shown in FIG. 18, in some aspects, process 1800 may include receiving DCI that includes a field that explicitly or implicitly indicates a HARQ-ACK timeline (block 1810). For example, the UE may receive DCI that includes a field that explicitly or implicitly indicates a HARQ-ACK timeline, as described above in connection with FIGS. 12 and 13.

As further shown in FIG. 18, in some aspects, process 1800 may include determining a value of the field, wherein a first value of the field explicitly indicates the HARQ-ACK timeline and a second value of the field implicitly indicates the HARQ-ACK timeline according to a reference configuration (block 1820). For example, the UE may determine a value of the field, as described above in connection with FIGS. 12 and 13. In some aspects, a first value of the field explicitly indicates the HARQ-ACK timeline and a second value of the field implicitly indicates the HARQ-ACK timeline according to a reference configuration.

As further shown in FIG. 18, in some aspects, process 1800 may include transmitting ACK/NACK feedback based at least in part on the HARQ-ACK timeline (block 1830). For example, the UE may transmit ACK/NACK feedback based at least in part on the HARQ-ACK timeline, as described above in connection with FIGS. 12 and 13.

In some aspects, the ACK/NACK feedback is transmitted in a second slot indicated by a default reference configuration based at least in part on receiving an indication that a first slot, in which the UE was instructed to transmit the ACK/NACK feedback according to the HARQ-ACK timeline, has been reconfigured as a downlink-only slot.

In some aspects, the second value of the field further indicates a downlink assignment index for the ACK/NACK feedback. In some aspects, the ACK/NACK feedback includes a plurality of multiplexed or bundled ACK/NACK indications determined based at least in part on the downlink assignment index.

Although FIG. 18 shows example blocks of process 1800, in some aspects, process 1800 may include additional blocks, fewer blocks, different blocks, or differently arranged blocks than those depicted in FIG. 18. Additionally, or alternatively, two or more of the blocks of process 1800 may be performed in parallel.

Figure 19:
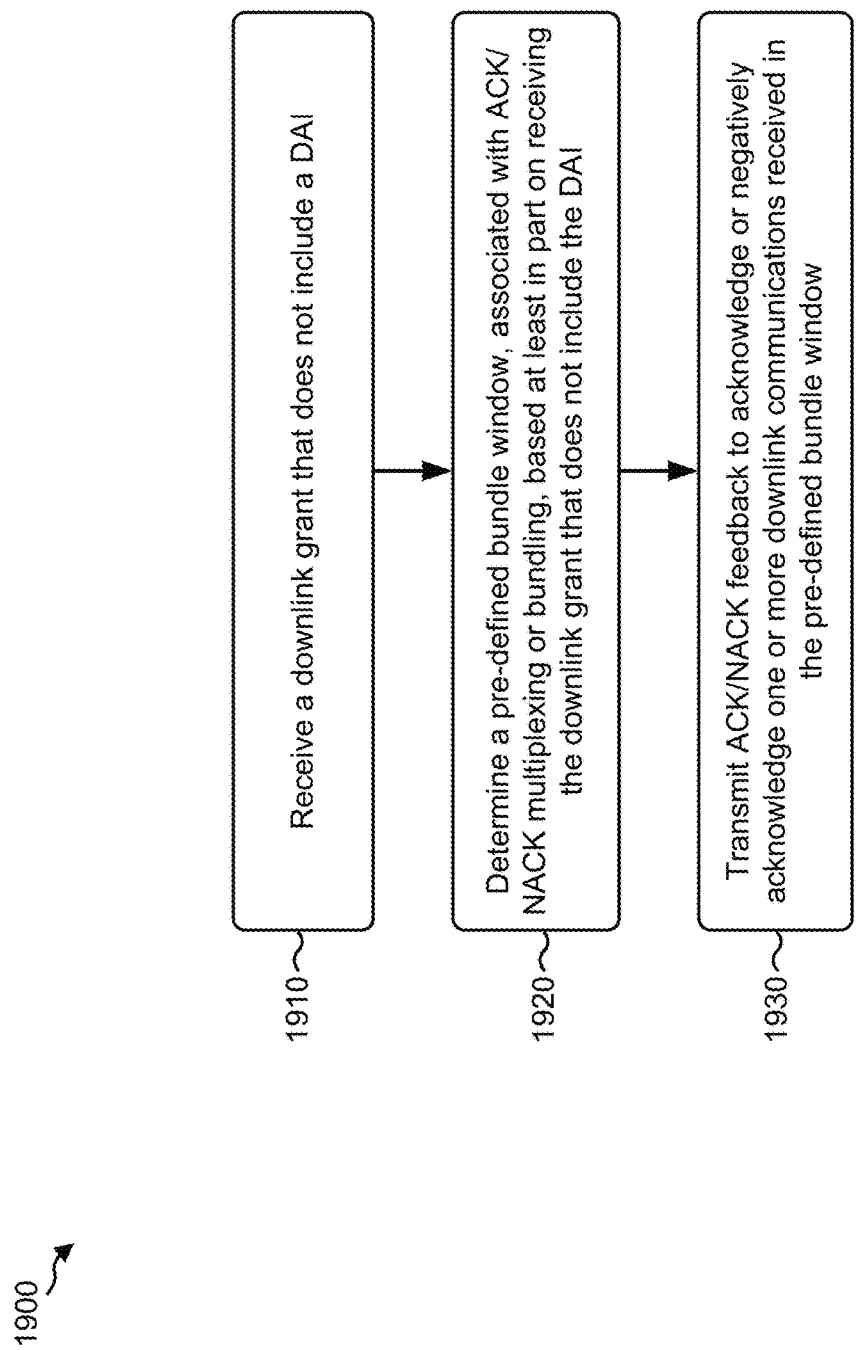

FIG. 19 is a diagram illustrating an example process 1900 performed, for example, by a UE, in accordance with various aspects of the present disclosure. Example process 1900 is an example where a UE (e.g., UE 120 and/or the like) performs HARQ-ACK timeline indication and/or HARQ-ACK multiplexing and bundling in New Radio.

As shown in FIG. 19, in some aspects, process 1900 may include receiving a downlink grant that does not include a DAI (block 1910). For example, the UE may receive a downlink grant that does not include a DAI, as described above in connection with FIGS. 14 and 15.

As further shown in FIG. 19, in some aspects, process 1900 may include determining a pre-defined bundle window, associated with ACK/NACK multiplexing or bundling, based at least in part on receiving the downlink grant that does not include the DAI (block 1920). For example, the UE may determine a pre-defined bundle window, as described above in connection with FIGS. 14 and 15. In some aspects, the UE may determine the pre-defined bundle window based at least in part on receiving the downlink grant that does not include the DAI. In some aspects, the bundle window is associated with ACK/NACK multiplexing or bundling.

As further shown in FIG. 19, in some aspects, process 1900 may include transmitting ACK/NACK feedback to acknowledge or negatively acknowledge one or more downlink communications received in the pre-defined bundle window (block 1930). For example, the UE may transmit ACK/NACK feedback to acknowledge or negatively acknowledge one or more downlink communications received in the pre-defined bundle window, as described above in connection with FIGS. 14 and 15.

In some aspects, the ACK/NACK feedback indicates ACK, NACK, or discontinuous transmission (DTX) for each slot included in the pre-defined bundle window. In some aspects, the UE may receive an uplink grant for the ACK/NACK feedback that indicates one or more slots in the pre-defined bundle window in which the one or more downlink communications were scheduled. In some aspects, the one or more slots are indicated using at least one of: a bitmap, an index corresponding to a pre-defined slot pattern, or some combination thereof.

Although FIG. 19 shows example blocks of process 1900, in some aspects, process 1900 may include additional blocks, fewer blocks, different blocks, or differently arranged blocks than those depicted in FIG. 19. Additionally, or alternatively, two or more of the blocks of process 1900 may be performed in parallel.

Figure 20:
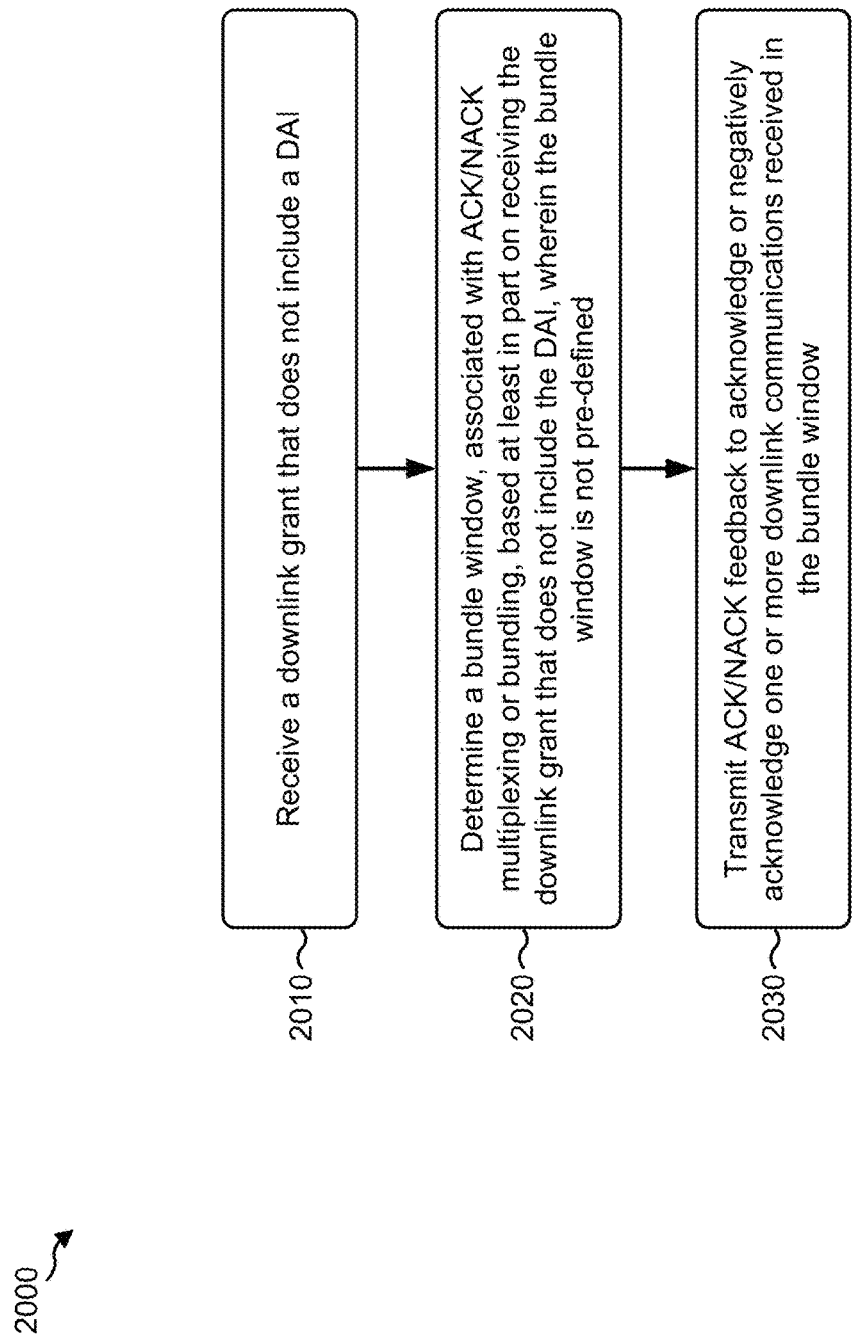

FIG. 20 is a diagram illustrating an example process 2000 performed, for example, by a UE, in accordance with various aspects of the present disclosure. Example process 2000 is an example where a UE (e.g., UE 120 and/or the like) performs HARQ-ACK timeline indication and/or HARQ-ACK multiplexing and bundling in New Radio.

As shown in FIG. 20, in some aspects, process 2000 may include receiving a downlink grant that does not include a DAI (block 2010). For example, the UE may receive downlink grant that does not include a DAI, as described above in connection with FIGS. 16 and 17.

As further shown in FIG. 20, in some aspects, process 2000 may include determining a bundle window, associated with ACK/NACK multiplexing or bundling, based at least in part on receiving the downlink grant that does not include the DAI, wherein the bundle window is not pre-defined (block 2020). For example, the UE may determine a bundle window, as described above in connection with FIGS. 16 and 17. In some aspects, the bundle window may not be pre-defined. In some aspects, the bundle window may be associated with ACK/NACK multiplexing or bundling. In some aspects, the UE may determine the bundle window based at least in part on receiving the downlink grant that does not include the DAI.

As further shown in FIG. 20, in some aspects, process 2000 may include transmitting ACK/NACK feedback to acknowledge or negatively acknowledge one or more downlink communications received in the bundle window (block 2030). For example, the UE may transmit ACK/NACK feedback to acknowledge or negatively acknowledge one or more downlink communications received in the bundle window, as described above in connection with FIGS. 16 and 17.

In some aspects, the bundle window is determined based at least in part on a timing indication included in the downlink grant, wherein the timing indication indicates a number of slots between reception of a downlink communication and an ACK/NACK indication corresponding to the downlink communication. In some aspects, the timing indication indicates a start of the bundle window. In some aspects, the UE may indicate the start of the bundle window to a base station.

In some aspects, the bundle window is determined based at least in part on an indication received from a base station. In some aspects, the indication is an uplink grant for the ACK/NACK feedback that indicates a start of the bundle window.

In some aspects, the bundle window is determined based at least in part on a maximum bundle window size. In some aspects, the maximum bundle window size is determined based at least in part on a maximum timing indication value or a maximum number of possible timing indication values.

Although FIG. 20 shows example blocks of process 2000, in some aspects, process 2000 may include additional blocks, fewer blocks, different blocks, or differently arranged blocks than those depicted in FIG. 20. Additionally, or alternatively, two or more of the blocks of process 2000 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving a downlink grant that does not include a downlink assignment index (DAI);
   determining a pre-defined bundle window, associated with acknowledgement/negative acknowledgement (ACK/NACK) multiplexing or bundling, based at least in part on receiving the downlink grant that does not include the DAI, wherein the pre-defined bundle window includes a fixed number of slots;
   receiving an uplink grant for ACK/NACK feedback that indicates one or more slots, of the fixed number of slots, in which one or more downlink communications were scheduled; and
   transmitting the ACK/NACK feedback to acknowledge or negatively acknowledge the one or more downlink communications received in the pre-defined bundle window, wherein the ACK/NACK feedback indicates information for each slot of the fixed number of slots.

2. The method of claim 1, wherein the information includes ACK, NACK, or discontinuous transmission (DTX) for each slot included in the fixed number of slots.

3. The method of claim 1, wherein the one or more slots are indicated using at least one of:
   a bitmap,
   an index corresponding to a pre-defined slot pattern, or
   some combination thereof.

4. The method of claim 1, wherein information regarding the fixed number of slots is indicated in a radio resource control (RRC) configuration message.

5. The method of claim 1, wherein the uplink grant includes information that indicates, for a slot of the fixed number of slots, whether a downlink communication was scheduled for the slot.

6. The method of claim 5, wherein the information includes an index corresponding to a pre-defined slot pattern.

7. A method of wireless communication performed by a user equipment (UE), comprising:
   receiving a downlink grant that does not include a downlink assignment index (DAI);
   determining a bundle window, associated with acknowledgement/negative acknowledgement (ACK/NACK) multiplexing or bundling, based at least in part on a timing indication included in the downlink grant that does not include the DAI, wherein the bundle window is not pre-defined, wherein the timing indication indicates a number of slots between reception of a downlink communication and an ACK/NACK indication corresponding to the downlink communication, and wherein the timing indication indicates a start of the bundle window; and
   transmitting ACK/NACK feedback to acknowledge or negatively acknowledge one or more downlink communications received in the bundle window.

8. The method of claim 7, further comprising indicating the start of the bundle window to a base station.

9. The method of claim 7, wherein the bundle window is determined based at least in part on an indication received from a base station.

10. The method of claim 9, wherein the indication is an uplink grant for the ACK/NACK feedback that indicates the start of the bundle window.

11. The method of claim 7, wherein the bundle window is determined based at least in part on a maximum bundle window size.

12. The method of claim 11, wherein the maximum bundle window size is determined based at least in part on a maximum timing indication value or a maximum number of possible timing indication values.

13. A user equipment (UE) for wireless communication, comprising:
   a memory; and
   one or more processors operatively coupled to the memory, the memory and the one or more processors configured to:
      receive a downlink grant that does not include a downlink assignment index (DAI);
      determine a pre-defined bundle window, associated with acknowledgement/negative acknowledgement (ACK/NACK) multiplexing or bundling, based at least in part on receiving the downlink grant that does not include the DAI, wherein the pre-defined bundle window includes a fixed number of slots;

receive an uplink grant for ACK/NACK feedback that indicates one or more slots, of the fixed number of slots, in which one or more downlink communications were scheduled; and transmit the ACK/NACK feedback to acknowledge or negatively acknowledge the one or more downlink communications received in the pre-defined bundle window, wherein the ACK/NACK feedback indicates information for each slot of the fixed number of slots.

14. The UE of claim 13, wherein the information includes ACK, NACK, or discontinuous transmission (DTX) for each slot included in the fixed number of slots.

15. The UE of claim 13, wherein the one or more slots are indicated using at least one of:
a bitmap,
an index corresponding to a pre-defined slot pattern, or
some combination thereof.

16. The UE of claim 13, wherein information regarding the fixed number of slots is indicated in a radio resource control (RRC) configuration message.

17. The UE of claim 13, wherein the uplink grant includes information that indicates, for a slot of the fixed number of slots, whether a downlink communication was scheduled for the slot.

18. The UE of claim 17, wherein the information includes an index corresponding to a pre-defined slot pattern.

19. A user equipment (UE) for wireless communication, comprising:
a memory; and
one or more processors operatively coupled to the memory, the memory and the one or more processors configured to:
receive a downlink grant that does not include a downlink assignment index (DAI);
determine a bundle window, associated with acknowledgement/negative acknowledgement (ACK/NACK) multiplexing or bundling, based at least in part on a timing indication included in the downlink grant that does not include the DAI, wherein the bundle window is not pre-defined, wherein the timing indication indicates a number of slots between reception of a downlink communication and an ACK/NACK indication corresponding to the downlink communication, and wherein the timing indication indicates a start of the bundle window; and
transmit ACK/NACK feedback to acknowledge or negatively acknowledge one or more downlink communications received in the bundle window.

20. The UE of claim 19, further comprising indicating the start of the bundle window to a base station.

21. The UE of claim 19, wherein the bundle window is determined based at least in part on an indication received from a base station.

22. The UE of claim 21, wherein the indication is an uplink grant for the ACK/NACK feedback that indicates the start of the bundle window.

23. The UE of claim 19, wherein the bundle window is determined based at least in part on a maximum bundle window size.

24. The UE of claim 23, wherein the maximum bundle window size is determined based at least in part on a maximum timing indication value or a maximum number of possible timing indication values.

* * * * *